US011662513B2

(12) United States Patent
Stannard

(10) Patent No.: US 11,662,513 B2
(45) Date of Patent: May 30, 2023

(54) NON-UNIFORM SUB-PUPIL REFLECTORS AND METHODS IN OPTICAL WAVEGUIDES FOR AR, HMD AND HUD APPLICATIONS

(71) Applicant: META PLATFORMS TECHNOLOGIES, LLC, Menlo Park, CA (US)

(72) Inventor: Adrian Lee Stannard, St Leonards-On-Sea (GB)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 497 days.

(21) Appl. No.: 16/739,103

(22) Filed: Jan. 9, 2020

(65) Prior Publication Data

US 2020/0225400 A1 Jul. 16, 2020

Related U.S. Application Data

(60) Provisional application No. 62/790,458, filed on Jan. 9, 2019.

(51) Int. Cl.
*G02B 27/01* (2006.01)
*F21V 8/00* (2006.01)

(52) U.S. Cl.
CPC ......... *G02B 6/0041* (2013.01); *G02B 6/0065* (2013.01); *G02B 27/0172* (2013.01)

(58) Field of Classification Search
None
See application file for complete search history.

(56) References Cited

U.S. PATENT DOCUMENTS

| | | | |
|---|---|---|---|
| 3,121,992 A | 2/1964 | Fritz et al. | |
| 4,220,400 A | 9/1980 | Vizenor | |
| 4,232,943 A | 11/1980 | Rogers | |
| 4,545,646 A | 10/1985 | Chern et al. | |
| 4,767,186 A | 8/1988 | Bradley, Jr. et al. | |
| 4,968,117 A | 11/1990 | Chern et al. | |
| 5,050,946 A | 9/1991 | Hathaway et al. | |
| 5,076,664 A | 12/1991 | Migozzi | |
| 5,202,950 A | 4/1993 | Arego et al. | |
| 5,253,637 A | 10/1993 | Maiden | |
| 5,535,025 A | 7/1996 | Hegg | |

(Continued)

FOREIGN PATENT DOCUMENTS

CN 206757088 U 12/2017
EP 0785457 A2 7/1997
(Continued)

OTHER PUBLICATIONS

Notice of Allowance received for U.S. Appl. No. 16/709,787 dated Sep. 3, 2021, 26 pages.

(Continued)

*Primary Examiner* — Chris H Chu
(74) *Attorney, Agent, or Firm* — Weaver Austin Villeneuve & Sampson LLP

(57) ABSTRACT

Methods based on growth pattern models are utilized to determine patterns of reflective dots in optical combiners or other components for augmented reality (AR), head mounted displays (HMD) and/or head up display (HUD) applications. Optical combiners including the reflective dots arranged in the grown patterns are provided.

18 Claims, 27 Drawing Sheets

(56) References Cited

U.S. PATENT DOCUMENTS

| | | | |
|---|---|---|---|
| 5,848,119 A | 12/1998 | Miyake et al. | |
| 5,886,822 A | 3/1999 | Spitzer | |
| 5,896,438 A | 4/1999 | Miyake et al. | |
| 5,959,726 A | 9/1999 | Riley et al. | |
| 5,991,085 A | 11/1999 | Rallison et al. | |
| 6,057,966 A | 5/2000 | Carroll et al. | |
| 6,157,291 A | 12/2000 | Kuenster et al. | |
| 6,204,974 B1 | 3/2001 | Spitzer | |
| 6,222,677 B1 | 4/2001 | Budd et al. | |
| 6,236,511 B1 | 5/2001 | Brown | |
| 6,262,019 B1 | 7/2001 | Keller et al. | |
| 6,288,846 B1 | 9/2001 | Stoner, Jr. | |
| 6,353,503 B1 | 3/2002 | Spitzer et al. | |
| 6,563,648 B2 | 5/2003 | Gleckman et al. | |
| 6,577,311 B1 | 6/2003 | Crosby et al. | |
| 6,607,286 B2 | 8/2003 | West et al. | |
| 6,671,100 B1 | 12/2003 | McRuer | |
| 6,714,174 B2 | 3/2004 | Suyama et al. | |
| 6,809,871 B2 | 10/2004 | Heller et al. | |
| 6,829,095 B2 | 12/2004 | Amitai | |
| 6,926,420 B2 | 8/2005 | Sung | |
| 7,059,728 B2 | 6/2006 | Alasaarela | |
| 7,079,318 B2 | 7/2006 | Shikama et al. | |
| 7,209,097 B2 | 4/2007 | Suyama et al. | |
| 7,336,244 B2 | 2/2008 | Suyama et al. | |
| 7,418,202 B2 | 8/2008 | Biernath et al. | |
| 7,446,943 B2 | 11/2008 | Takagi et al. | |
| 7,506,987 B2 | 3/2009 | Nilsen | |
| 7,513,674 B1 | 4/2009 | Donahue | |
| 7,576,916 B2 | 8/2009 | Amitai | |
| 7,639,208 B1 | 12/2009 | Ha et al. | |
| 7,656,585 B1 | 2/2010 | Powell et al. | |
| 7,686,497 B2 | 3/2010 | Kropac et al. | |
| 7,688,347 B2 | 3/2010 | Dolgoff | |
| 7,703,931 B2 | 4/2010 | Nilsen | |
| 7,710,655 B2 | 5/2010 | Freeman et al. | |
| 7,876,489 B2 | 1/2011 | Gandhi et al. | |
| 7,936,519 B2 | 5/2011 | Mukawa et al. | |
| 7,944,616 B2 | 5/2011 | Mukawa | |
| 7,991,257 B1 | 8/2011 | Coleman | |
| 8,384,999 B1 | 2/2013 | Crosby et al. | |
| 8,964,292 B1 | 2/2015 | Marason et al. | |
| 8,988,463 B2 | 3/2015 | Stone Perez et al. | |
| 9,252,015 B2 | 2/2016 | Wu et al. | |
| 9,720,232 B2 | 8/2017 | Hua et al. | |
| 10,007,115 B2 | 6/2018 | Greenhalgh et al. | |
| 10,191,993 B2 | 1/2019 | Ross et al. | |
| 10,481,678 B2 | 11/2019 | Crispin | |
| 10,488,666 B2 | 11/2019 | Leighton et al. | |
| 10,623,722 B2 | 4/2020 | Markovsky et al. | |
| 10,649,209 B2 | 5/2020 | Leighton et al. | |
| 10,795,434 B2 | 10/2020 | Crispin | |
| 2001/0021239 A1 | 9/2001 | Itoga | |
| 2001/0033440 A1 | 10/2001 | Togino | |
| 2002/0021461 A1 | 2/2002 | Ono et al. | |
| 2002/0070904 A1 | 6/2002 | Okuyama | |
| 2003/0026001 A1 | 2/2003 | Heller et al. | |
| 2003/0098834 A1* | 5/2003 | Ide | G02B 6/0061 345/87 |
| 2003/0169397 A1 | 9/2003 | Reichow | |
| 2003/0184868 A1 | 10/2003 | Geist | |
| 2004/0114111 A1 | 6/2004 | Watanabe | |
| 2004/0207823 A1 | 10/2004 | Masaarela et al. | |
| 2005/0094292 A1 | 5/2005 | Cahall | |
| 2006/0119794 A1 | 6/2006 | Hillis et al. | |
| 2006/0132914 A1 | 6/2006 | Weiss et al. | |
| 2007/0008624 A1 | 1/2007 | Hirayama | |
| 2007/0177275 A1 | 8/2007 | McGuire | |
| 2009/0051879 A1 | 2/2009 | Vitale et al. | |
| 2009/0067178 A1* | 3/2009 | Huang | G02B 6/0065 219/121.85 |
| 2009/0167651 A1 | 7/2009 | Minaåto et al. | |
| 2010/0103078 A1 | 4/2010 | Mukawa et al. | |
| 2010/0149073 A1 | 6/2010 | Chaum | |
| 2010/0278480 A1 | 11/2010 | Vasylyev | |
| 2010/0290127 A1 | 11/2010 | Kessler et al. | |
| 2010/0321409 A1 | 12/2010 | Komori et al. | |
| 2011/0007277 A1 | 1/2011 | Solomon | |
| 2011/0050655 A1 | 3/2011 | Mukawa | |
| 2011/0083741 A1 | 4/2011 | Munro | |
| 2011/0083742 A1 | 4/2011 | Munro | |
| 2011/0155331 A1 | 6/2011 | Lopin | |
| 2011/0157600 A1 | 6/2011 | Lyon | |
| 2011/0213664 A1 | 9/2011 | Osterhout et al. | |
| 2011/0221656 A1 | 9/2011 | Haddick et al. | |
| 2011/0226332 A1 | 9/2011 | Ford et al. | |
| 2011/0227813 A1 | 9/2011 | Haddick et al. | |
| 2011/0255303 A1 | 10/2011 | Nichol et al. | |
| 2011/0286222 A1 | 11/2011 | Coleman | |
| 2012/0002294 A1 | 1/2012 | Dobschal | |
| 2012/0002295 A1 | 1/2012 | Dobschal et al. | |
| 2012/0019662 A1 | 1/2012 | Maltz | |
| 2012/0147038 A1 | 6/2012 | Perez et al. | |
| 2013/0147686 A1 | 6/2013 | Clavin | |
| 2013/0235191 A1 | 9/2013 | Miao | |
| 2013/0242392 A1 | 9/2013 | Amirparviz et al. | |
| 2014/0153102 A1 | 6/2014 | Chang | |
| 2014/0361957 A1 | 12/2014 | Hua et al. | |
| 2015/0205126 A1 | 7/2015 | Schowengerdt | |
| 2016/0047967 A1* | 2/2016 | Kim | G02B 6/0036 362/606 |
| 2016/0109708 A1* | 4/2016 | Schowengerdt | G09G 5/18 345/633 |
| 2016/0154244 A1 | 6/2016 | Border et al. | |
| 2016/0238774 A1* | 8/2016 | Koike | G02B 6/005 |
| 2016/0270656 A1 | 9/2016 | Samec et al. | |
| 2016/0327789 A1 | 11/2016 | Klug et al. | |
| 2016/0343164 A1 | 11/2016 | Urbach et al. | |
| 2017/0332070 A1 | 11/2017 | Markovsky et al. | |
| 2018/0011322 A1 | 1/2018 | Leighton et al. | |
| 2018/0045960 A1 | 2/2018 | Palacios et al. | |
| 2018/0308455 A1 | 10/2018 | Hicks et al. | |
| 2018/0348524 A1 | 12/2018 | Blum et al. | |
| 2020/0049998 A1 | 2/2020 | Leighton | |
| 2020/0183152 A1 | 6/2020 | Pennell | |
| 2020/0183174 A1 | 6/2020 | Noui et al. | |
| 2020/0225400 A1 | 7/2020 | Stannard | |
| 2020/0233218 A1 | 7/2020 | Leighton et al. | |
| 2020/0278553 A1 | 9/2020 | Leighton et al. | |
| 2021/0055788 A1 | 2/2021 | Crispin | |

FOREIGN PATENT DOCUMENTS

| | | |
|---|---|---|
| EP | 1798592 A2 | 6/2007 |
| EP | 1736812 B1 | 4/2010 |
| EP | 3355315 A1 | 8/2018 |
| KR | 10-2018-0041224 A | 4/2018 |
| RU | 2069835 C1 | 11/1996 |
| TW | 271580 B | 1/2007 |
| WO | 2002099509 A1 | 12/2002 |
| WO | 2007014371 A2 | 2/2007 |
| WO | 2007019138 A1 | 2/2007 |
| WO | 2007062098 A2 | 5/2007 |
| WO | 2008109420 A2 | 9/2008 |
| WO | 2008110942 A1 | 9/2008 |
| WO | 2010033859 A2 | 3/2010 |
| WO | 2010062481 A1 | 6/2010 |
| WO | 2010106248 A1 | 9/2010 |
| WO | 2010123934 A1 | 10/2010 |
| WO | 2011124897 A1 | 10/2011 |
| WO | 2011130715 A2 | 10/2011 |
| WO | 2018009885 A1 | 1/2018 |
| WO | 2018166006 A1 | 9/2018 |
| WO | 2020123018 | 6/2020 |
| WO | 2020123561 | 6/2020 |
| WO | 2020146683 | 7/2020 |

OTHER PUBLICATIONS

Non-Final Office Action received for U.S. Appl. No. 16/709,787 dated Apr. 6, 2021, 24 pages.

Non-Final Office Action received for U.S. Appl. No. 16/709,787 dated May 21, 2021, 43 pages.

(56) References Cited

OTHER PUBLICATIONS

Notice of Allowance received for U.S. Appl. No. 16/214,142 dated Jan. 22, 2021, 17 pages.
Page et al., "Pattern formation in spatially heterogeneous Turing reaction-diffusion models", Physica D: Nonlinear Phenomena, vol. 181, 2003. pp. 80-101.
Office Action dated Mar. 15, 2018, issued on U.S. Appl. No. 15/206,111, filed Jul. 8, 2016, assigned to DAQRI LLC.
Office Action dated Feb. 19, 2019, issued on U.S. Appl. No. 15/206,111, filed Jul. 8, 2016, assigned to DAQRI LLC.
Office Action dated Nov. 3, 2017 issued on U.S. Appl. No. 15/206,111, filed Jul. 8, 2016, 8 pages.
Aye T M, "Miniature Guided Light Array Sequential Scanning Display for Head Mounted Displays," Final Report to US Army CECOM, May 15, 1998. Retrieved on-line from http://handle.dtic.mil/100.2/ADA350745, 35 pages.
Corresponding GB Patent Application GB 1200321.6 specification and drawings, filed Jan. 9, 2011, at UK Intellectual Property Office, to Cerr Limited, Inventors: Crosby, David Nicholas et al., 46 pages.
UK Intellectual Property Office, Combined Search and Examination Report under Sections 17 and 18(3) of UK Patents Act 1977, dated May 8, 2012, issued on corresponding GB Patent Application GB1200312.6,to Cerr Limited, Inventors: Crosby, David Nicholas et al., 3 pages.
International Search Report and Written Opinion dated Nov. 2, 2017 on International Patent Application PCTUS1741228, filed in Jul. 17, 2017 in the name of Daqri, LLC, 21 pages.
International Search Report and Written Opinion dated Feb. 21, 2020 issued on International Patent Application PCT/US2019/065551, filed Dec. 10, 2019, in the name of DAQRI LLC, 18 pages.
Office Action dated Aug. 10, 2017 issued on U.S. Appl. No. 14/825,148, 36 pages.
Office Action dated Mar. 10, 2018, issued on U.S. Appl. No. 15/404,172, filed Jan. 1, 2017 assigned to DAQRI LLC, 41 pages.
Office Action dated Jan. 31, 2019 issued on U.S. Appl. No. 15/893,599, filed Feb. 10, 2018, 30 pages.
Office Action dated Aug. 8, 2019 issued on U.S. Appl. No. 15/893,599, filed Feb. 10, 2018, 48 pages.
International Search Report dated Jan. 9, 2020, issued on International Patent Application PCT/US19/55198, filed Oct. 8, 2019 in the name of Daqri, LLC.
International Search Report and Written Opinion dated May 19, 2020 on International Patent Application PCT/US2020/012995, filed Jan. 9, 2020 in the name of Daqri, LLC, 40 pages.
Office Action dated Apr. 24, 2020 issued on U.S. Appl. No. 16/658,078, filed Nov. 19, 2019, 57 pages.
Office Action dated Feb. 3, 2020, issued on U.S. Appl. No. 16/596,648, filed Oct. 8, 2019, 36 pages.
Office Action dated Aug. 27, 2020 issued on U.S. Appl. No. 16/739,103, filed Jan. 9, 2020, 2 pages.
Office Action dated Mar. 1, 2016 issued on U.S. Appl. No. 14/825,148, filed Aug. 12, 2015, 11 pages.
International Search Report and the Written Opinion of International Search Authority / US, dated Oct. 24, 2016 on International Patent Application PCT/US16/41588, filed Jul. 8, 2016 in the name of DAQRI LLC.
European Search Report for European Application No. 20738704.4, dated Mar. 1, 2022, 7 pages.
International Preliminary Report on Patentability for International Application No. PCT/US2020/012995, dated Jul. 22, 2021, 10 Pages.
Office Action dated Nov. 3, 2022 for Chinese Application No. 202080020078.3, filed Jan. 9, 2020, 8 pages.

\* cited by examiner

NON-UNIFORM SUB-PUPIL REFLECTORS AND METHODS IN OPTICAL WAVEGUIDES FOR AR, HMD AND HUD APPLICATIONS

CROSS REFERENCE TO RELATED APPLICATIONS

This application claims the benefit of U.S. Provisional Application No. 62/790,458, filed Jan. 9, 2019, and entitled "Non-uniform sub-pupil reflectors and methods in Optical Waveguides for AR, HMD and HUD applications". The entire contents of the patent application identified above is incorporated by reference herein as if fully set forth.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate to optical apparatus and methods. More particularly but not exclusively, embodiments relate to augmented reality image and/or virtual reality optical components that incorporate reflective dots. Additionally or alternatively, embodiments relate to optical waveguides including reflective dots. Additionally or alternatively, embodiments relate to methods of determining any one or combination of the shape, size and distribution of reflective dots in optical waveguides or other components for augmented reality (AR), head mounted displays (HMD) and/or head up display (HUD) applications.

BACKGROUND

An optical waveguide is a fundamental component in many augmented reality display or virtual reality systems.

Existing systems that depend upon diffractive techniques result in 30% of the light and imagery being diffracted out of the display in the opposite direction to the wearer, and partially reflective systems can reflect up to 20%. There is a need to provide improved optical waveguides that prevent unwanted light and imagery being directed out of the opposite side of the display to the wearer—for instance in military applications where stray light needed is to be minimized during nighttime operations, or in general augmented reality applications where visibility of the wearer's eyes and facial expression is impeded by the outward-coupled computer generated imagery.

SUMMARY

The present application addresses the analysis and techniques required to optimize the distribution and the shape of each reflective dot in optical waveguides such that the MTF can be at an optimum for the human eye, and diffractive effects can be substantially reduced.

Non-limiting examples of the aforesaid optical waveguides including reflective dots are described in U.S. patent application Ser. No. 15/206,111, filed Jul. 8, 2016, now US Publication No. US-2018-0011322-A1, published Jan. 11, 2018, entitled "Optical Combiner Apparatus" and the entire contents of which is incorporated by reference as if fully set forth herein.

According to a first aspect, there is provided an optical combiner. The optical combiner may comprise an optically transparent substrate and a patterned region included in the optically transparent substrate and disposed along a wave propagation axis of the substrate. The patterned region may be partially optically reflective and partially optically transparent. The patterned region may comprise a plurality of optically transparent regions of the optically transparent substrate and a plurality of optically reflective regions inclined relative to the optical transparent substrate wave propagation axis.

By including in the optical substrate a patterned region which is partially optically reflective and partially optically transparent, improved optical combiners are provided that are easier to manufacture and have better performance.

According to another aspect, an augmented reality optical combiner is provided. The optical combiner may comprise a transparent optical waveguide substrate for receiving an optical image and viewing there through a distant real world scene and a plurality of reflective elements arranged within the transparent optical waveguide for reflecting the received optical image. The plurality of reflective elements may be arranged in such a way that, when the optical combiner is in use, the received optical image is reflected and superimposed on the real world scene view so as to allow viewing of the distant real world scene while simultaneously viewing the optical image superimposed on the real world scene.

According to yet another aspect, an augmented reality optical apparatus is provided. The augmented reality optical apparatus may comprise a head mounted display and at least one of the aforementioned optical combiners supported on the head mounted display.

According to yet other aspects, methods of combining optical rays are provided. In one aspect, a method of combining optical rays comprises propagating first optical image rays along a length of an optical transparent waveguide substrate towards a pattern region included in said optical transparent substrate; transmitting second optical image rays through a width of the optical waveguide substrate; and selectively reflecting out of said optical substrate said first optical image rays at different points along said substrate from reflective regions of said pattern region; said reflected first optical image rays superimposing on said second optical image rays transmitted out of said optical transparent substrate.

The first optical image rays may be computer generated rays. The second optical image rays may be from a distant real world scene. The pattern region may be a pattern region as set forth hereinbefore.

According to some embodiments, the optical combiner may comprise
a transparent optical waveguide substrate for receiving an optical image comprising a plurality of optical image rays and viewing there through a distant real world scene; wherein said transparent optical waveguide substrate comprises a volume of optical transparent material having a rear face for receiving optical rays of said distant real world scene, a front face, opposite said rear face, for allowing said optical rays of said distant real world scene to exit from said transparent optical waveguide substrate, an optical image receiving end or side for receiving said optical image, and an optical propagation axis extending along said volume of said transparent optical waveguide substrate from said optical image receiving side or end; a plurality of reflective elements arranged within said transparent optical waveguide substrate for reflecting said received optical image; wherein said plurality of reflective elements comprise a plurality of reflective dots inclined at the same angle relative to the optical image wave propagation axis, and wherein said plurality of reflective dots are traverse spaced apart perpendicular to the optical image propagation axis and spaced apart along the volume of said optical transparent substrate; a plurality of traversley extending optical transparent regions of said transparent optical substrate, said plurality of traversley extending optical transparent regions interposing traversley spaced apart reflective dots; the plurality of reflective dots and the plurality of traversley extending optical transparent regions are distributed traversley and along the volume of said transparent optical substrate such that optical image rays that are unreflected by reflective dots distributed nearer to said optical image receiving end or side selectively pass through said traversley extending optical transparent regions between adjacent traversley spaced apart reflective dots and without being reflected by reflective dots until they are selectively reflected further away from said optical image receiving end or side by reflective dots disposed at different points along said volume of said optical transparent substrate so that said selectively reflected optical image rays together form a reflection image of the optical image being received.

According some aspects, an optical combiner is provided. The optical combiner may comprise an optically transparent substrate; and a patterned region included in said optically transparent substrate and disposed along a wave propagation axis of said substrate; wherein said patterned region is partially optically reflective and partially optically transparent; wherein said patterned region comprises a plurality of optically transparent regions of said optically transparent substrate and a plurality of optically reflective sub-pupil dots, said plurality of optically reflective sub-pupil dots being inclined relative to said optical transparent substrate wave propagation axis; and wherein said patterned region is a growth pattern region.

According to another aspect, an optical combiner constructed by a process is provided. The process may comprise: providing an optically transparent substrate; and incorporating in said optically transparent substrate at least one patterned region in at least one common or distinct plane traversing a wave propagation axis of said substrate; wherein said patterned region is partially optically reflective and partially optically transparent; wherein incorporating in said optically transparent substrate the at least one patterned region in the at least one common or distinct plane disposed traversing the wave propagation axis of said substrate includes the steps of: determining a pattern of a plurality of optically reflective sub-pupil dots by growing the pattern of the plurality of optically reflective sub-pupil dots according to a pattern growth model, and arranging in said optically transparent substrate in said common or distant plane said plurality of optically reflective sub-pupil dots in the pattern grown according to the pattern growth model.

According to yet another aspect, a method of determining a pattern of a plurality of optically reflective sub-pupil dots for an optical combiner is provided. The method comprises: a) providing an initial growth pattern of optically reflective sub-pupil dots at a first time t−1 according to a pattern growth model; b) performing MFT analysis on said initial growth pattern at the first time t−1; c) determining acutance A based on said MFT analysis performed in step b), d) performing FFT analysis on said initial growth pattern at the first time t−1; e) determining diffraction based on said FFT analysis performed in step d); f) repeating steps a) to e) at a second time t; and g) selecting the growth pattern at a particular time according to the determined acutance A and diffraction.

According to yet another aspect, a computer-readable medium including contents that are configured to cause a processor to perform a method of growing a pattern of a plurality of optically reflective sub-pupil dots for an optical combiner, the method comprising: a) providing an initial growth pattern of optically reflective sub-pupil dots at a first time t−1 according to a pattern growth model; b) performing MFT analysis on said initial growth pattern at the first time t−1; c) determining acutance A based on said MFT analysis performed in step b), d) performing FFT analysis on said initial growth pattern at the first time t−1; e) determining diffraction based on said FFT analysis performed in step d); f) repeating steps a) to e) at a second time t; and g) selecting the growth pattern at a particular time according to the determined acutance A and diffraction.

According to yet another aspect, a device for growing a pattern of reflective dots comprises a data processor configured to a) provide an initial growth pattern of optically reflective sub-pupil dots at a first time t−1 according to a pattern growth model; b) perform MFT analysis on said initial growth pattern at the first time t−1; c) determine acutance A based on said MFT analysis performed in step b), d) perform FFT analysis on said initial growth pattern at the first time t−1; e) determine diffraction based on said FFT analysis performed in step d); f) repeat steps a) to e) at a second time t; and g) select the growth pattern at a particular time according to the determined acutance A and diffraction.

BRIEF DESCRIPTION OF THE DRAWINGS

In order that the present invention may be more readily understood, reference will now be made to the accompanying drawings, in which:

FIG. 11 (b) illustrates a single element having a 400 μm aperture and a 10% border for the purpose of explaining methods and apparatus of embodiments of the present technology;

FIG. 11 (c) illustrates the MTF virus frequency for the single element having a 400 μm and a 10% aperture of FIG. 11(b) or the purpose of explaining methods and apparatus of embodiments of the present technology;

FIG. 11 (d) illustrates a single element having a 400 μm aperture and a 60% border;

FIG. 11 (e) illustrates the MTF virus frequency for the single element having a 400 μm and a 60% aperture of FIG. 11(d);

FIG. 12 (b) illustrates the MTF versus frequency of the logarithmic grid of FIG. 12(a);

DETAILED DESCRIPTION OF PREFERRED EMBODIMENTS

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Technical features described in this application can be used to construct various embodiments of apparatus relating to optical waveguides or other components in which any one or combination of the shape, size and distribution of reflective dots is configured for augmented reality (AR), head mounted displays (HMD) and/or head up display (HUD) applications.

Technical features described in this application can be used to construct various embodiments of methods for configuring any one or combination of the shape, size and distribution of reflective dots in optical combiners for augmented reality (AR), head mounted displays (HMD) and/or head up display (HUD) applications.

Figure 1:
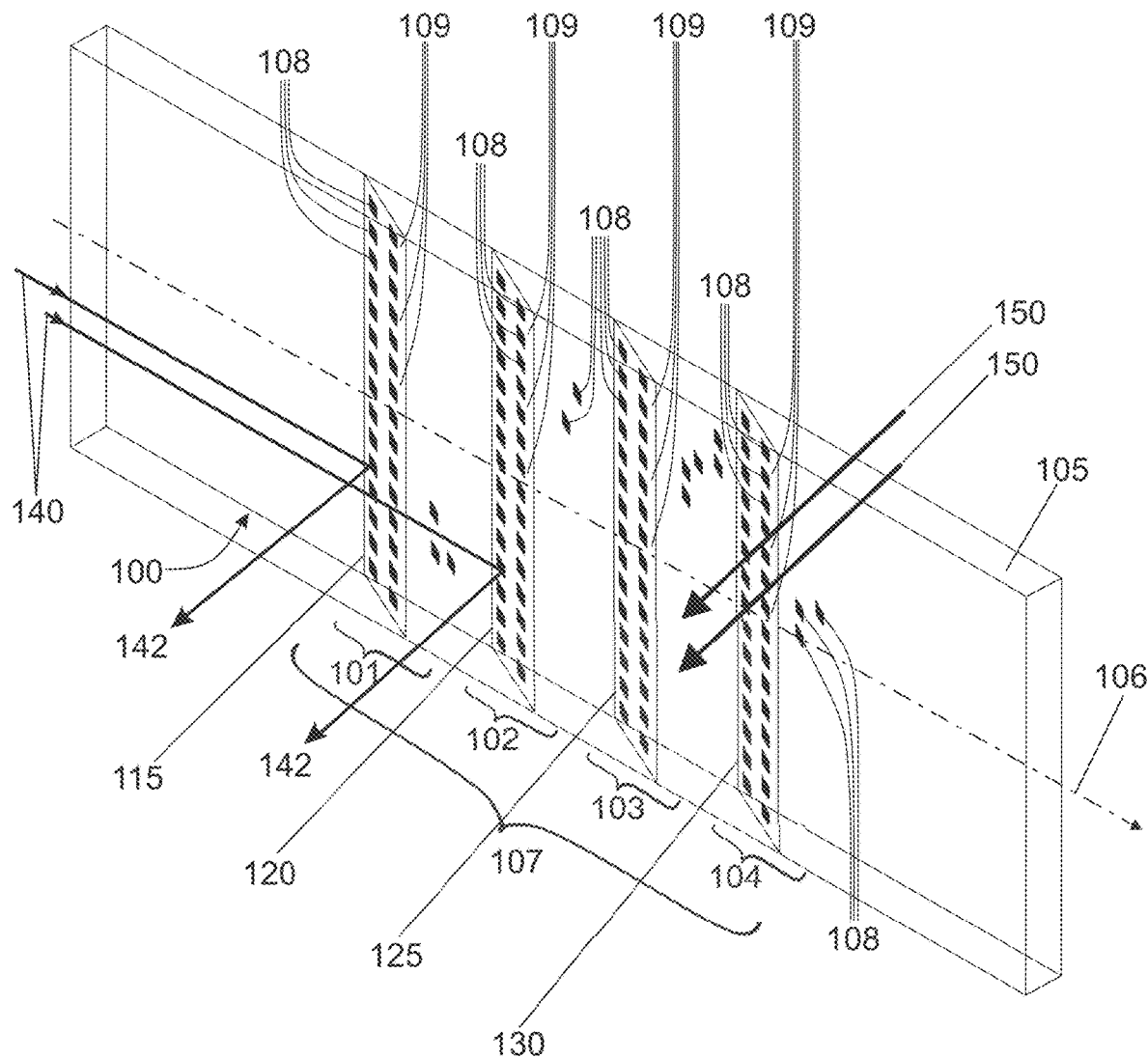
FIG. 1 is a front perspective view of an exemplary optical combiner for which any one or combination of the shape, size and distribution of reflective dots is configurable in accordance with an embodiment.

Reference will first be made to optical waveguides described in US-2018-0011322-A1 published Jan. 11, 2018, entitled "Optical Combiner Apparatus", the entire contents of which is incorporated by reference as if fully set forth herein, which are examples of optical waveguides including reflective dots for which any one or combination of the shape, size and distribution of the reflective dots is configurable in accordance with some aspects of the present technology. To this end referring now to the accompanying drawings, FIG. 1 shows a front view of an exemplary optical combiner in accordance with an embodiment. Optical combiner 100 is formed from an optically transparent waveguide substrate 105. Substrate 105 has a wave propagation axis 106 extending along a length of the waveguide substrate. Optical image rays entering an optical receiving end or side of substrate 105 propagate through the substrate along the propagation axis 106.

Substrate 105 is a see-through substrate made from optical waveguide substrate material such as but not limited to glass or plastic. Optical rays 150 entering the substrate rear face pass through the substrate material and exit from the substrate front face. An observer located on one side of the substrate and looking through the front face of the substrate can see through the substrate material and observe objects, scenes etc. located on the other side of the substrate.

A patterned region 107 is included in a volume of the optically transparent substrate. Patterned region 107 is partially optically reflective and partially optically transparent. Patterned region 107 comprises a plurality of optically transparent regions 109 of optically transparent substrate 105 and a plurality of optically reflective regions 108 inclined relative to optical transparent substrate wave propagation axis 106. For sake of clarity, not all reflective regions are shown and not all shown reflective regions 108 and transparent regions 109 have been labeled with reference numerals. Optical image rays 140, which are captured in an end of the substrate, propagate along propagation axis 106, pass into patterned region 107, and are selectively reflected at different points along substrate 105 by inclined optical reflective regions 108. The reflected optical image rays 142 exit the front face of substrate 105.

For ease of illustration, rays 140 are shown only as straight through rays. There are countless other rays that bounce along the waveguide rather than passing straight through which are not shown (examples are given in FIGS. 2A, 2B & 6 of a bouncing ray). In some embodiments, patterned region 107 is a regular patterned region. In some other embodiments, pattern region 107 is an irregular patterned region or a combination of a regular pattern region and an irregular patterned region.

The patterned region can take various forms. In some embodiments, optically reflective regions 108 of pattern region 107 are a plurality of optically reflective elements distributed in optically transparent substrate 105, for example as shown in FIG. 1, and optically transparent regions 109 are regions of optical transparent substrate material 105 unoccupied by the plurality of reflective elements. In some other embodiments, pattern region 107 is a reverse design in which and optically transparent regions comprise a plurality of apertures or openings formed in reflective material layer or volume included in the substrate and optically reflective regions comprise the optically reflective material.

In the optical combiner of FIG. 1, optical reflective regions 108 comprise optical reflective elements which are reflective dots. For ease of explanation and visualization, in FIG. 1 and the other accompanying figures, reflective dots are shown enlarged and not to scale. Furthermore, not all reflective dots are shown. In practice, there are for example typically thousands of small reflective dots in the substrate and the dots are small enough that they cannot easily be seen by the human eye so that they do not substantially disrupt the see through performance of the optical combiner. In some embodiments, the optical reflective elements may be other types of discrete reflective elements such as reflective symbols, characters or the like rather than reflective dots.

In some embodiments, each of at least some of the reflective dots or other elements are fully reflective. In some other embodiments, each of at least some of the reflective dots or other reflective elements is partially reflective. For example, at least some of the reflective dots each have reflectivities between 5-100%. In some embodiments, the reflectivites of at least some of the reflective elements are the same. In some embodiments, the reflectivities of at least some of the reflective elements are different.

Optical reflective dots are each made of a reflective material such as but not limited to a single reflective metal layer or multiple layers of reflective oxides or other materials. The reflective dot material may deposited by known deposition techniques. In some embodiments, injection forming with over-molded reflective layers and optical 3D printing, may be used to form the optical substrate including the pattern region. In the embodiment of FIG. 1, reflective dots are distributed in a plurality of distinct planes 115, 120, 125, 130 spaced apart along a length of substrate. Each plane 115, 120, 125, 130, extends between top and bottom sides of substrate 105 and is inclined relative to propagation axis 106 as shown in FIG. 1. Reflective dots in each plane have a regular pattern and shape such as the rectangular matrix of square dots illustrated in FIG. 1. However, in other embodiments, the pattern of reflective dots in one or more of the planes can have other regular shaped matrixes or patterns, or can have an irregular pattern. Furthermore, as will be explained in more detail below, the shape, size, tilt, and/or spacing of each reflective dot, or at least some reflective dots, can be the same or can be different from one another.

Additionally, in some embodiments, reflective dots 108 are distributed in a volume section of the substrate that extends beyond each distinct plane 115, 120, 125, 130. By way of example, FIG. 1 illustrates reflective dots 108 are distributed in the distinct planes 115, 120, 125, 130 and also occupy intermediate regions of the substrate between the planes. In some embodiments of the optical combiner, reflective dots 108 are not distributed in distinct planes but rather are distributed throughout distinct volume sections spaced apart along a length of the waveguide substrate.

In any event, irrespective of how reflective elements are exactly distributed in the different embodiments, the reflective elements can form groups that are spaced along a length of substrate 105. For example, in FIG. 1, a first group 101 of reflective dots is arranged for partially reflecting optical image rays propagating along a length of substrate 105. Reflective elements of subsequent groups 102, 103, 104 spaced apart further along the wave guide are arranged for reflecting optical image rays unreflected by the first group of reflective elements.

Each group of reflective dots distributed about a distinct plane and/or a distinct volume section together with optical transparent substrate gaps therebetween collectively operate as a partially reflective individual reflector. FIG. 1 illustrates four such individual reflectors. However, in other embodiments, the optical combiner may have any number of such reflectors ranging from a single reflector to many reflectors.

Optical combiner 100 is an extremely simple structure made up of reflective elements rather than reflectors which have a complex set of reflective layers coated over the entire area of each reflector.

Operation of the optical combiner as an optical image combiner is very simple, when the rays that form the image travel along the waveguide substrate some of them hit reflective dots of the first reflector and are re-directed towards the eye. The majority of the rays miss the dots as they only occupy a small area of the first reflector. If for example the dots occupy 5% of the overall area then overall reflectivity is about 5% too and 95% of the image energy passes through to the next reflector and so on. The reflective dots reflect optical rays 140 that have propagated straight through into the substrate but also the other rays 140 that arrive via a wide "bounce" and hit the reflective dots at a glancing angle (see for example the optical combiners shown in FIGS. 2A, 2B & 6 for examples of bouncing oncoming rays and reflections from reflective dots).

In some embodiments, the first reflector (group of dots 101) has a relatively low reflectivity (small area of dots) and subsequent ones have greater reflectivity (bigger area of dots) increasing reflectivity the further along the waveguide substrate. The dot area to optical transparent gap ratio is varied to obtain chosen reflectivity for each reflector.

Figure 9:
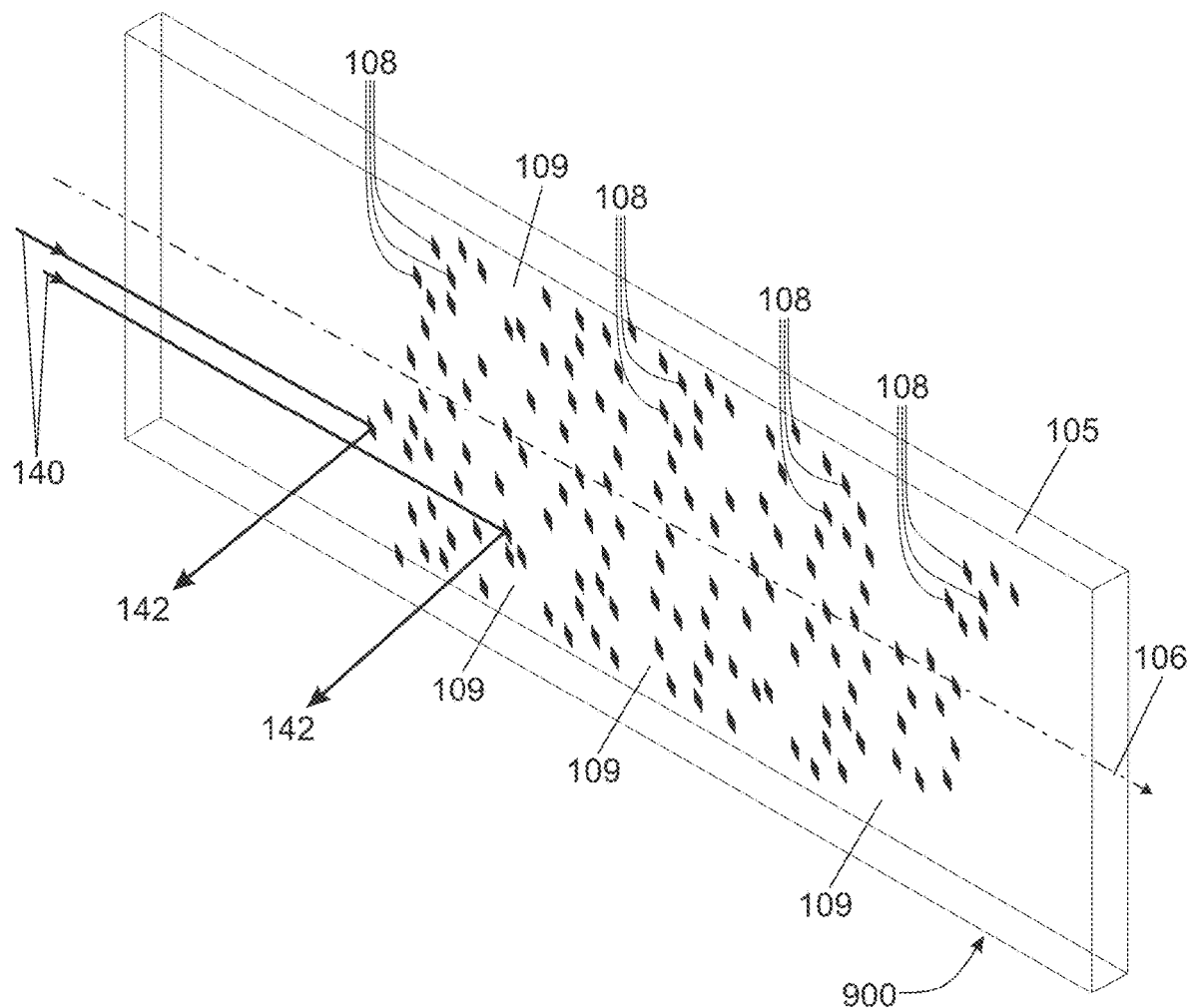
FIG. 9 is a front perspective view of an exemplary optical combiner in accordance with another embodiment.

In yet some other embodiments, all reflective dots 108 are distributed throughout a substrate volume extending along a length of the waveguide rather than occupy distinct planes and/or distinct volume sections. In such embodiments, reflective dots 108 and optically transparent gaps or regions therebetween effectively form one continuous partially reflective reflector extending through the substrate volume. FIG. 9 illustrates one such optical combiner 900 according to an embodiment. Reflective dots 108 are shown distributed throughout a volume of substrate 105. As already mentioned, for ease of illustration not all reflective dots are shown. Furthermore, the specific pattern of dots shown in FIG. 9 is merely an example dot pattern. The reflective dots 108 are still arranged so that the relatively reflectively increases from low to high further along the continuous reflector.

In yet some other embodiments of the optical combiner, the optical substrate is a non see-through substrate.

Figure 2A:
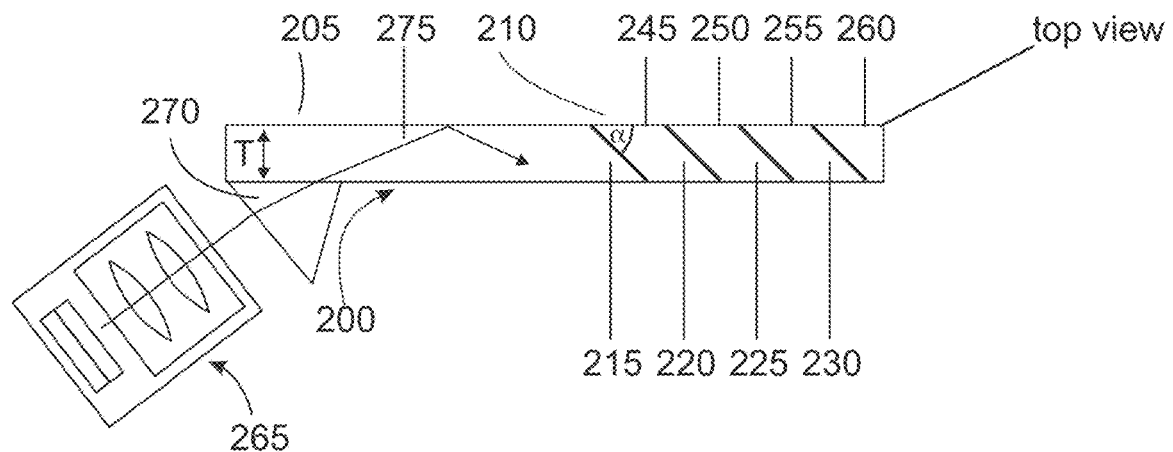
FIG. 2A is a top plan view of an optical combiner for which any one or combination of the shape, size and distribution of reflective dots is configurable in accordance with an embodiment for use with an image projector.
Figure 2B:
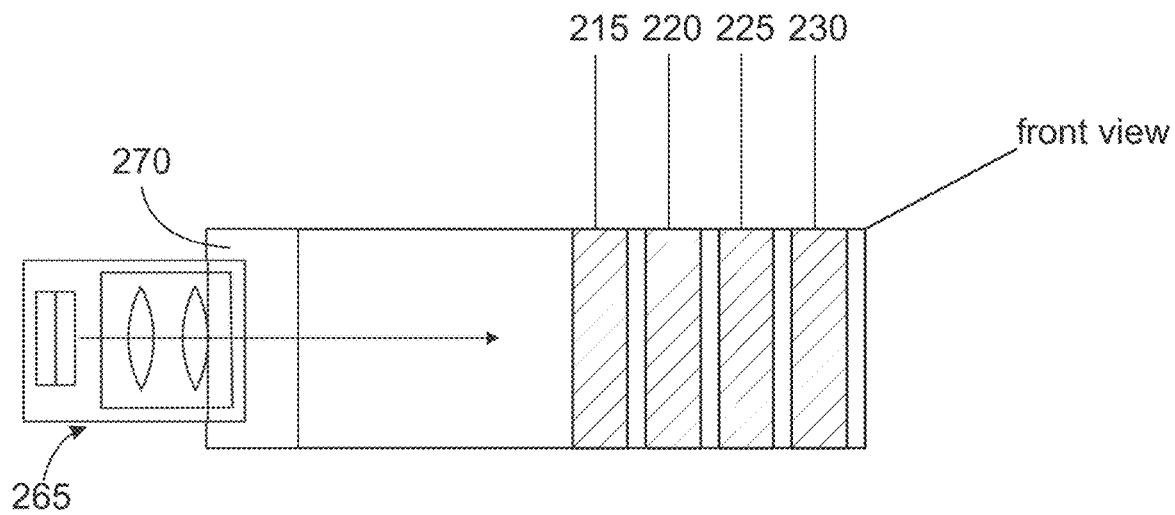
FIG. 2B is a front view of the optical combiner of FIG. 2A.

FIGS. 2A & 2B show the top & front views, respectively, of an optical combiner for use with an optical image generator according to an embodiment. Optical combiner 200 is a slab 205 (flat, parallel sides) of glass or plastic, or other optically transparent waveguide for near eye displays. In alternative embodiments, the waveguide is curved and the faces may not necessarily be parallel. Optical combiner 200 is similar to optical combiner 100 but for ease of fabrication each partially reflective reflector is a sparse aperture reflective surface made up of a surface pattern of the reflective dots or other types of reflective elements. There is an array of four such reflectors 215, 220, 225, 230 shown in FIGS. 2A & 2B but optical combiner 200 can have any number and typically 3 and 6. Reflector 215 has the lowest reflectivity in the array, reflector 220 has the next highest reflectivity, reflector 225 the next highest reflectivity and reflector 240 the highest reflectivity. By way of example, in some embodiments, first reflector 215 has a reflectivity of about 5-7%, second reflector 220 has a reflectivity of about 10%, third reflector 225 has a reflectivity of 20% and fourth reflector 230 with a reflectivity of about 80%.

Sparse aperture surface reflectors 215-230 comprise a plurality of reflective dots (such as dots 108), or other reflective elements, that are formed on a surface and can have many different configurations. In some embodiments, the reflective dots or other elements are arbitrary shapes and are arranged in a matrix on the surface in randomized positions. Reflective dots may be positioned about the surface in a deterministic manner or according to a random function.

In FIGS. 2A & 2B the optical source for generating optical image rays 140 is an image projector 265. A simplified situation is depicted in FIGS. 2A & 2B showing how a single ray 275 originating from the projector 265 is optically coupled into the waveguide substrate 205 using a prism 270. However, other optical coupling methods are possible including direct injection into the end of the waveguide, such as shown in FIG. 1 as rays 140. In other embodiments, other optical generators may be used instead of, or in addition to, projector 265.

Figure 3A:
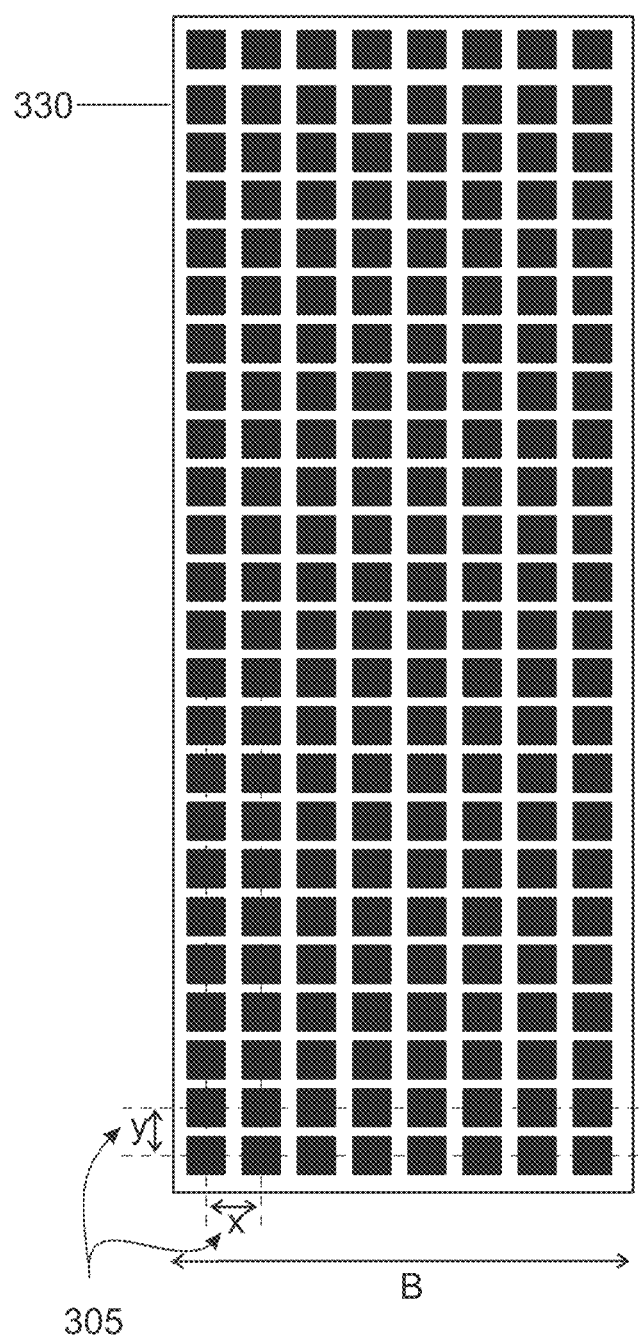
FIG. 3A is a front view of a sparse aperture reflector for which any one or combination of the shape, size and distribution of reflective dots is configurable in accordance with an embodiment.
Figure 3B:
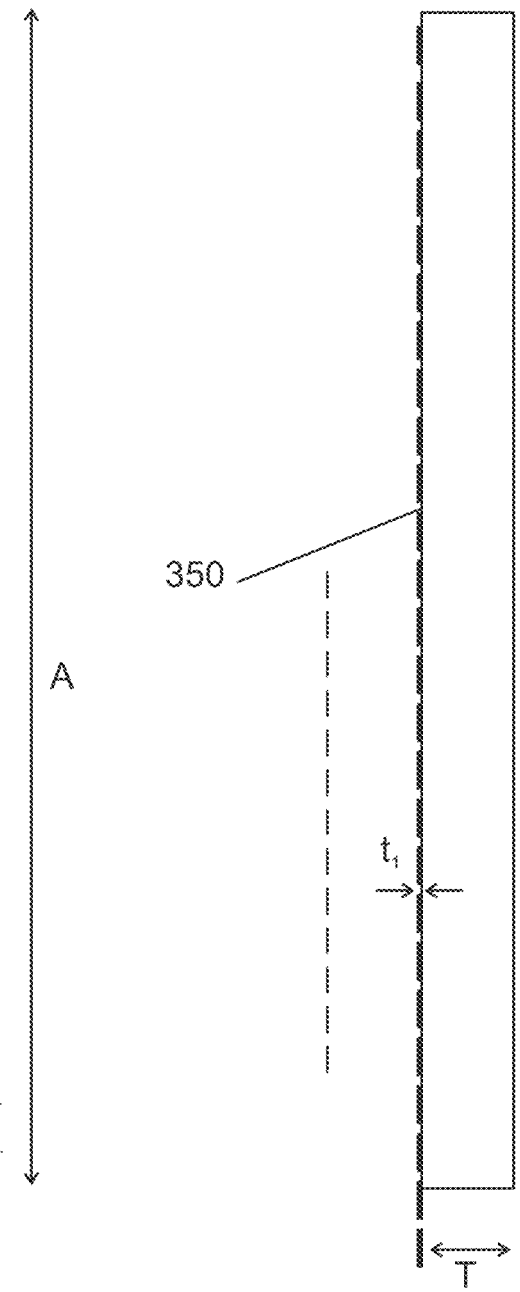
FIG. 3B is a side view of the sparse aperture reflector of FIG. 3A.

One such sparse aperture reflector surface is shown in more detail in FIGS. 3A & 3B, which illustrate a plan view and side view, respectively, of a sparse aperture reflector system according to one embodiment (for use as one or more of the reflectors 215-230 in the optical combiner of FIGS. 2A & 2B). For ease of fabrication, sparse aperture reflector system 330 has a simple matrix 350 of reflective dots 180 or other elements on a regular XY pitch 305. Each black square region in the matrix showing FIG. 3A contains a plurality of reflective dots. By way of example, each square contains hundreds of smaller squares approx 20 micron in size. In FIGS. 3A & 3B, reflective matrix 350 is carried on a separate optically transparent substrate which when assembled with the other reflectors forms part of the optical waveguide substrate 205. In some other embodiments, reflective matrix 350 is formed directly on a surface of an intermediate region of the waveguide substrate 205 (see for example intermediate regions of 245-260 of FIGS. 2A & 2B). The height A of sparse aperture reflector surface 330 is typically but not limited to 35-50 mm but will vary depending on the specific optical combiner characteristics desired. The width B of sparse aperture reflector surface is determined according to the number of reflectors required in the optical combiner and according to the thickness of the optical wave guide substrate. The thickness T1 of the reflective dots or other elements will vary but is typically but not limited to 0.1-1 micrometers (um).

Figures 4A, 4B:
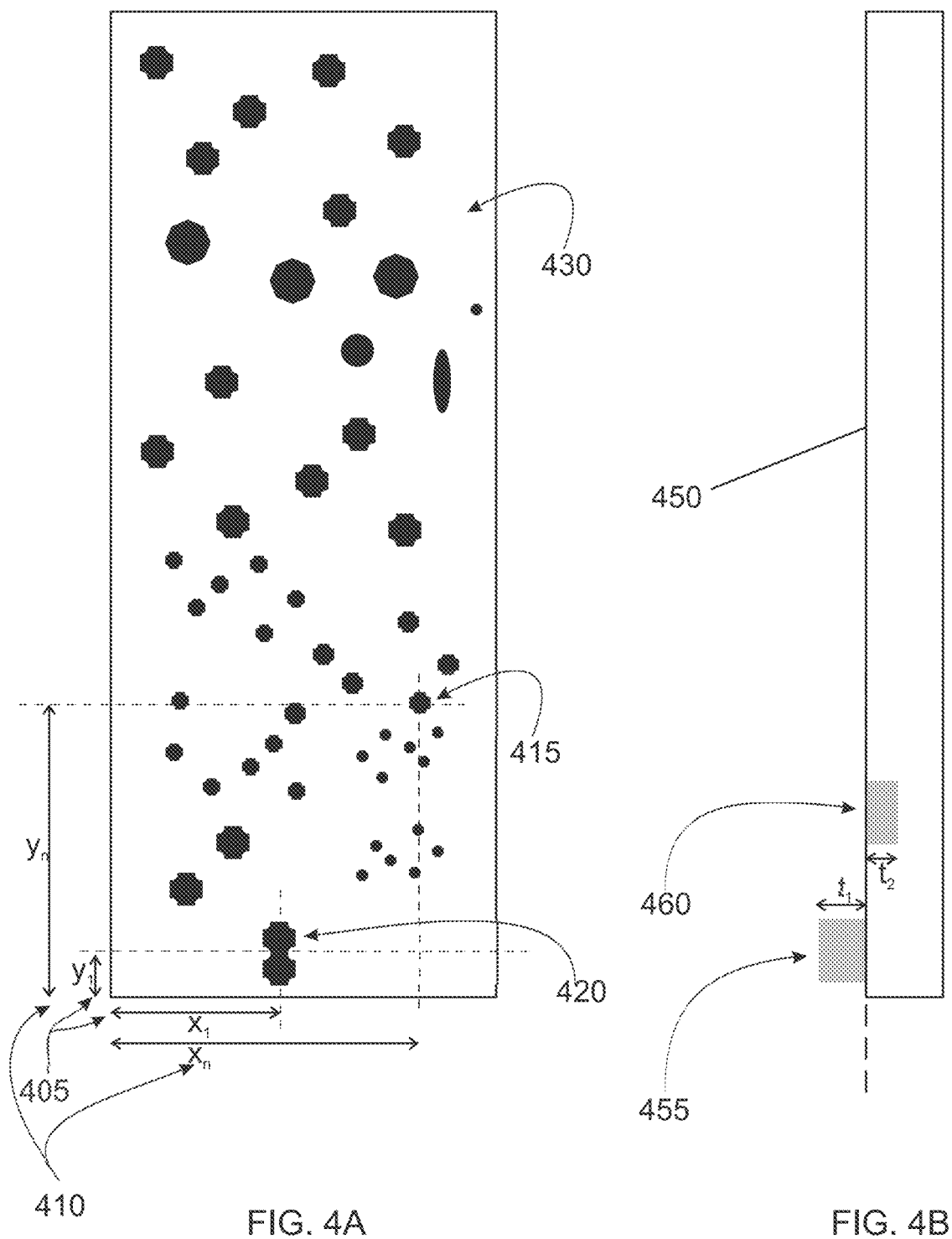
FIG. 4A is a front view of a sparse aperture reflector for which any one or combination of the shape, size and distribution of reflective dots is configurable in accordance with an embodiment.
FIG. 4B is a side view of the sparse aperture reflector of FIG. 4A.

FIGS. 4A & 4B illustrate a plan view and side view, respectively, of a sparse aperture reflector system according to another embodiment (for use as one or more of the reflectors 215-230 in the optical combiner of FIGS. 2A & 2B). Sparse aperture reflector system 400 differs from the system 300 in the arrangement and parameters of the reflective dots or other elements. As shown in FIGS. 4A & 4B, the reflective dots patterned on the front face of the reflector system have some different shapes. The dot shapes are regular shapes and/or random shapes. By way of example, in FIGS. 4A & 4B, first dot 420 has an arbitrary shape and second dot 415 has an arbitrary shape. Reflective dots have different separation distances. The reflecting dot thickness may also vary for different reflective dots. Optical combiner performance and imaging can be controlled and improved by optimization of various reflector parameters including but not limited to the following: shape of the dots (regular or random shapes), minimum dimension of a dot feature, maximum dimension of a dot feature, degree of randomization over surface, thickness of dot reflecting material, minimum separation between dots, maximum separation between dots and fraction of area occupied by dots. In some embodiments, at least some reflective dots or other elements have a fully or substantially reflective front side and fully or substantially absorbing rear side. As shown in FIGS. 4A & 4B, some reflective dots or elements include a buried relief reflector 460 and a positive relief reflector 455.

Figure 10:
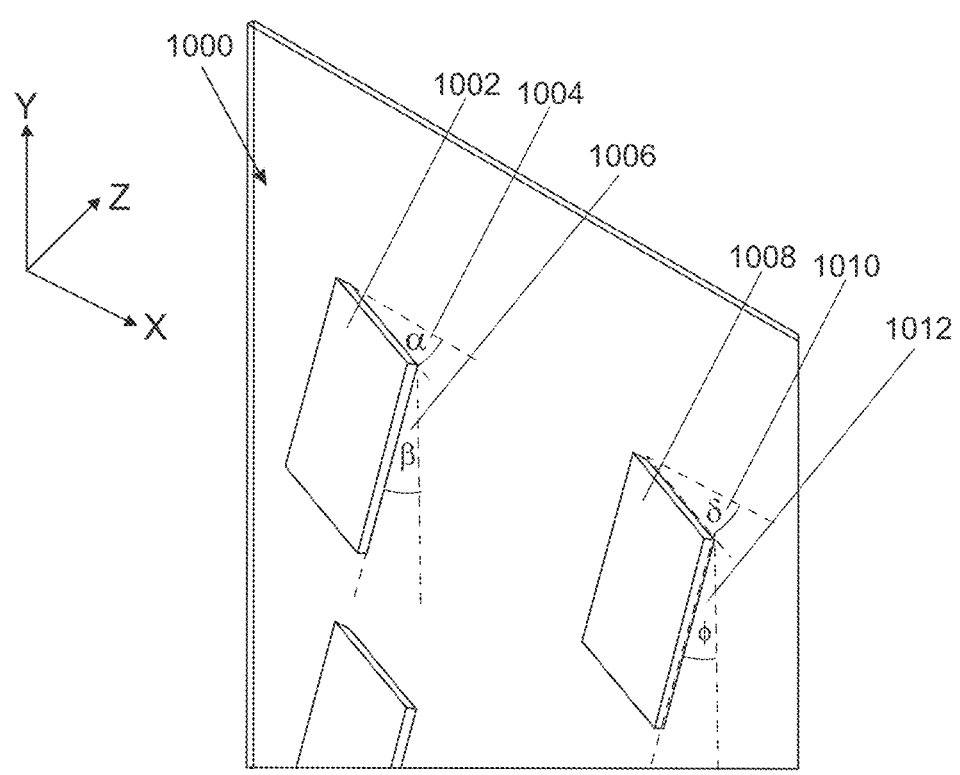
FIG. 10 is a partial view showing reflective elements of the optical combiner tilted at different angles relative to the common plane in which they are disposed according to one embodiment.

In some embodiments of the optical combiners described herein, at least some of the reflective elements 108, etc. in the optical substrate are tilted at different angles from one another and/or at least some of the reflective elements are tilted in parallel with one another. Also, in some further embodiments, some of the reflective elements are individually tilted relative to the planes occupied by the reflective elements. By way of example FIG. 10, is a partial view of the optical combiner showing reflective elements (in this case rectangular reflective dots) 1002, 1008 tilted at different angles relative to common plane 1000 in which they are occupied in the optical substrate according to one embodiment. First reflective dot 1002 is tilted in the x axis by a first angle 1004 relative to common plane 1000 whereas second reflective dot 1008 is tilted in the x axis by a second angle 1010 relative to the common plane, the second angle 1010 being different from the first angle 1004. Also, first reflective dot 1002 is tilted in the Z axis by a third angle 1006 relative to common plane 1000 whereas second reflective dot 1008 is titled in the z axis by a fourth angle 1012 relative common plane 1000, the fourth angle 1012 being different from the third angle 1006. In other embodiments, at least some of the reflective elements can be tilted in x, y, z planes (or any combination thereof) differently or in the same way)

The optical combiners of the described embodiments have many advantages over known waveguide reflectors. The optical combiners of embodiments are insensitive to input polarization unlike known combiners that require careful polarization control on transit through the reflectors. The optical combiners of embodiments have inherently broadband optical bandwidth unlike known combiners that require careful design to make sure reflectivity is maintained over a wide range of incidence angles. The optical combiners of embodiments are less complex because patterns of reflective dots or other elements can be fabricated using a single layer of reflective material. In contrast, in known combiners each reflector array will require 20 to 30 separate carefully deposited layers to make one reflecting surface. The optical combiners are easily fabricated and robust compared to known combiners which are difficult to manufacture due to the highly complex multiple layers of reflective films and the fragile nature of the multilayers.

Figure 5:
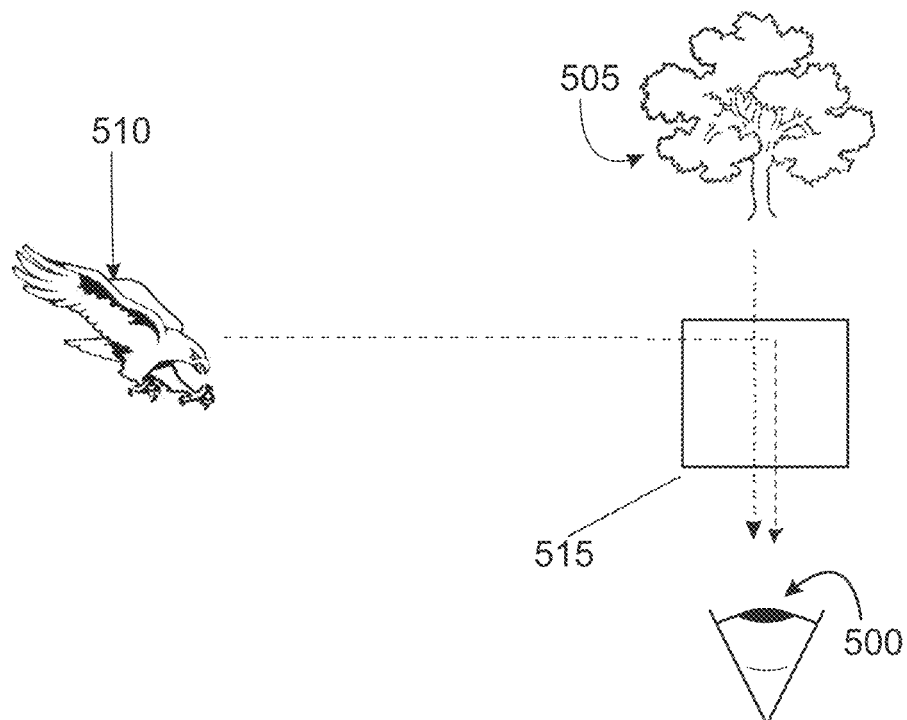
FIG. 5 is a schematic diagram showing generally how an augmented reality image combiner combines images according to one embodiment.

In some aspects, the optical combiners can be used for combining augmented reality images and a real world scenes. As indicated by FIG. 5, an augmented reality image combiner 515 is an optical structure that overlays the real world scene 505 with an optically projected computer generated image 510 and relays the combined image into the eye or eyes 500 of an observer. Optical combiner 515 is any one of the optical combiners described hereinbefore with reference to FIGS. 1-4. The plurality of reflective dots are arranged in such a way that, when the optical combiner is in use, the received computer generated optical image is reflected and superimposed on the real world scene view.

Figure 6:
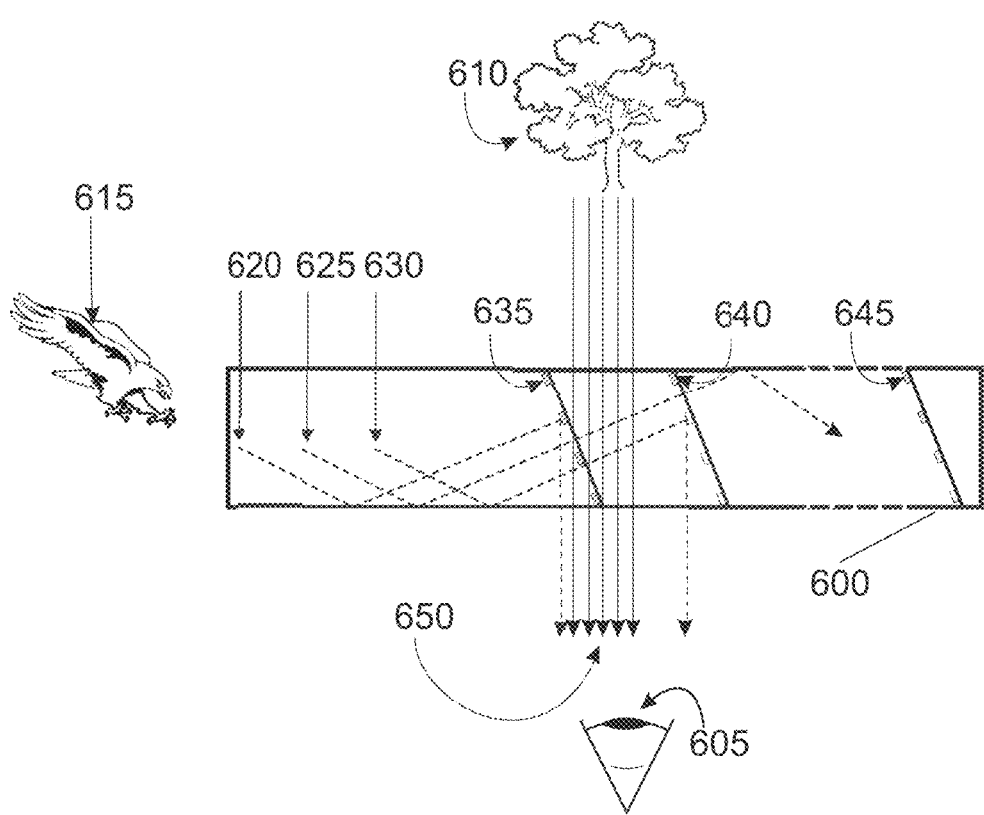
FIG. 6 is a schematic diagram showing in detail how an augmented reality image combiner combines images according to an embodiment.

In order to more adequately illustrate how the images are combined in an augmented reality image combiner, reference is made to FIG. 6 which is a simplified schematic of an augmented reality optical combiner system according to an embodiment. This figure demonstrates how an optically projected computer graphic rays contained within the waveguide are relayed into the observer's eye and how rays from the real world scene pass through. Optical combiner 600 can be any one of the optical combiners described hereinbefore with reference to FIGS. 1-4. However, for ease of explanation FIG. 6 has been greatly simplified to show three spaced apart sparse reflectors and show only four reflective dots on each sparse reflector. By way of example, guided rays 620, 625, 630 originating from a projected image 615 are captured in an optical receiving end of the optical waveguide substrate and are relayed towards the observer's eye 605. In particular, example guided ray 620 originating from the projected image 615 captured in the waveguide is relayed towards the observer's eye 605 off a reflective element formed on sparse area reflector n=1 635. Furthermore, example guided ray 625 originating from the projected image 615 and captured in the waveguide passes through transparent region of sparse area reflector 635 and subsequent transparent region of sparse area reflector n=2 640. Yet furthermore, example guided ray 630 originating from the projected image 615 captured in the waveguide is relayed towards the observer's eye 605 off a reflective element formed on sparse area reflector n=2. Arbitrary bundle of rays 650 originating from the real scene pass through the optical combiner.

Figure 7:
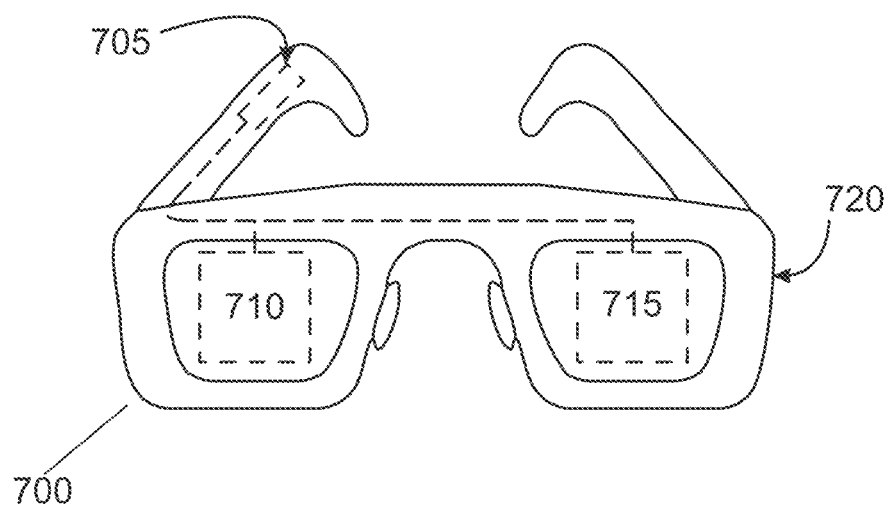
FIG. 7 is a front view of augmented reality head mounted display glasses according to an embodiment.

In some aspects, one or more of the optical combiners are incorporated in head mounted displays. In some embodiments, a pair of the optical combiners are included in glasses or Goggle form factor augmented reality head mounted displays. FIG. 7 shows a front view of a pair of the head mounted display glasses according to one embodiment. Glasses or Goggle type head mounted display 700 has a processing module 705 generating computer formed images for binocular view. A left eye optical combiner and projection system 710 and a right eye optical combiner and projection system 715 are included in the head mounted display. The optical combiner in each system 710, 715 is any one of the optical combiners of the embodiments described herein with or without reference to FIGS. 1-6. Optical image projector 265 and optical coupling 270 for example may form part of the projector system. An opto-mechanical frame 720 holds the optical parts securely and in the correct geometric alignment.

In some embodiments, the formed images are for monocular view and only one of the optical combiner and projection systems 710, 715 is included in the head mounted display.

Figure 8:
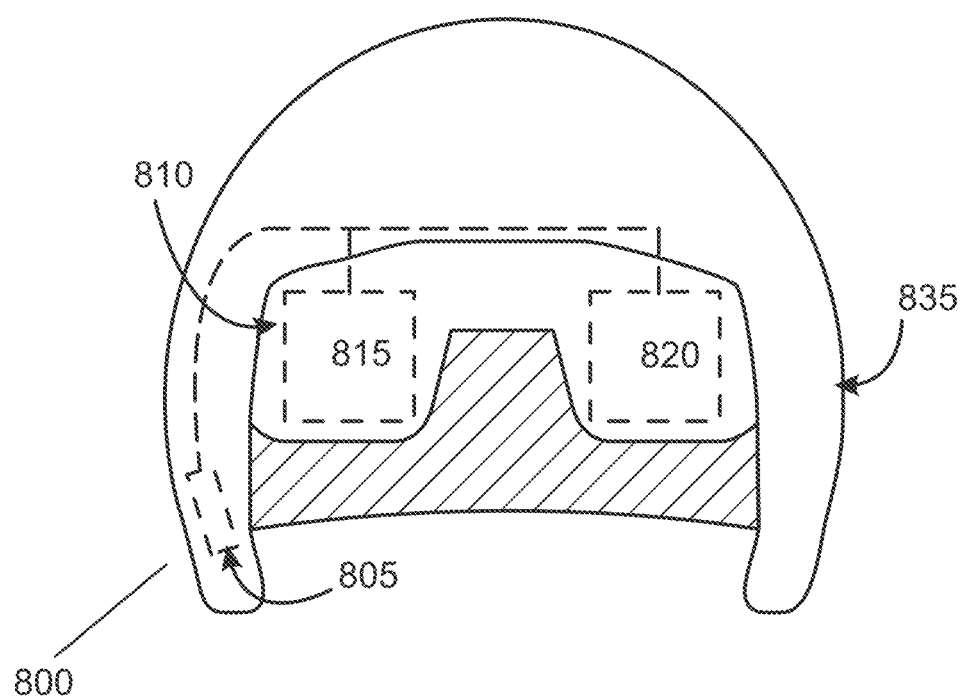
FIG. 8 is a front view of an augmented reality head mounted display helmet according to an embodiment.

In some embodiments, the head mounted display in which one or more of the optical combiners is incorporated is a helmet form factor augmented reality head mounted display. FIG. 8 shows a front view of a head mounted display helmet according to one embodiment. Helmet head mounted display 800 has a processing module 805 generating computer formed images for binocular view. A left eye optical combiner and projection system 815 and a right eye optical combiner and projection system 820 are included in the head mounted display. The optical combiner in each system 815, 820 is any one of the optical combiners of the embodiments described herein with or without reference to FIGS. 1-6. Optical image projector 265 and optical coupling 270 may for example form part of the projector system. An opto-mechanical sub frame 810 holds the optical parts securely and in the correct geometric alignment. Opto-mechanical sub frame 810 is supported by a mechanically robust shell 835 of the helmet.

In some embodiments, the formed images are for monocular view and only one of the optical combiner and projection systems 815, 820 is included in the head mounted display.

Reference will now be made to methods for configuring any one or combination of the shape, size and distribution of reflective dots in common or distinct planes in the optical waveguides of the embodiments illustrated in FIGS. 1 to 10 and described hereinbefore for augmented reality (AR), head mounted displays (HMD) and/or head up display (HUD) applications in accordance with aspects of the present technology. Reference will now also be made to the optical combiners and/or components thereof in which any one or combination of the shape, size and distribution of reflective dots is configured in accordance with such methods.

It will be appreciated that the methods for configuring any one or combination of the shape, size and distribution of reflective dots in the optical waveguides are not limited to configuring reflective dots in the aforesaid embodiments of near eye optical waveguides described above in relation to FIGS. 1 to 10 above and that, in other embodiments, the methods may be for configuring any one or combination of the shape, size and distribution of reflective dots in other optical waveguides and/or optical combiners but which rely on, or can use, patterned reflective dots in one or more common or distinct planes to reflect or partially reflect a computer generated image. Furthermore, it will be appreciated that optical combiners and apparatus in which any one or combination of the shape, size and distribution of reflective dots is configured in accordance with methods of some embodiments of the present technology may be optical waveguides and/or optical combiners that are different from the embodiments of the near eye optical waveguides described above in relation to FIGS. 1 to 10 but which rely on, or can use patterned reflective dots in one or more common distinct planes to reflect or partially reflect a computer generated image.

Definition: Sub-pupil reflector/sub-pupil-sized means that the dimension is below the smallest typical pupil size of a human eye, i.e. <2 mm. In order for a region to be a semi-reflective, the dimensions must be <400 micron in dimension (e.g. a circle of <400-micron diameter, or square of side <400 micron). Each reflective dot in the optical substrate forms an optical aperture. Simple geometry can be used to take account of tilt or inclination of the reflective dot to determine the shape and dimension of the reflective dot from a aperture computed according to modelling. Since there a plurality of reflective dots there are a plurality of sub-pupil optical apertures. It is therefore advantageous to adopt the following approach to modelling. As already indicated hereinbefore, the shape of the reflective dots may be regular or irregular in shape and are not in any way limited to the shapes shown in the accompanying figures.

The process of forming images on transparent reflector surfaces containing sub-pupil-sized reflective dots requires special treatment to minimize diffractive effects both on see through and reflected images as well as careful analysis of the modular transfer function (MTF) (resolution contrast) for both conditions.

In order to compute the MTF of an arbitrary aperture shape we note that the optical transfer function of an imaging system is given in terms of the Fourier transform by:

$$OTF = |H(f,\eta)| e^{-i\theta(f,\eta)} = MTF e^{i\theta(f,\eta)} \quad (1)$$

Where $\theta(f, \eta)$ is the Phase transfer function (PTF), dependent upon spatial frequency f with orientation angle η—this tells us how much the detail at each spatial frequency is shifted in position on the image plane relative to that detail on the object plane. When the axis of the image plane is the same as the axis of symmetry of a symmetrical point spread function, then the PTF is zero for all frequencies see C. W. a. O. Becklund, Introduction To The optical Transfer Function, SPIE, 2010, the entire contents of which is incorporated by reference as if fully set forth herein.

The modulus of the Fourier Transform $H(f, \eta)$ of the impulse function $h(f, \eta)$ is the MTF see equation [2].

The impulse function $h(f, \eta)$ itself is related to the diffraction pattern of an aperture in a diffraction limited system. This means the Fast Fourier transform, or FFT, can also be used to determine the PSF:

$$h(f,\eta) = [FFT|P(x,y)|]^2 \quad (2)$$

Where P(x,y) is the aperture function. The absolute square means the operation of $H(f, \eta)$ does not undo the FFT of the aperture function. In summary: The MTF is given by the Fourier transform of the PSF. The PSF is the square of the absolute value of the Fourier transform of the pupil function see equation [2]—i.e. the diffraction limited OTF is the 2D auto-correlation of the diffracting aperture P(x,y).

Figure 11A:
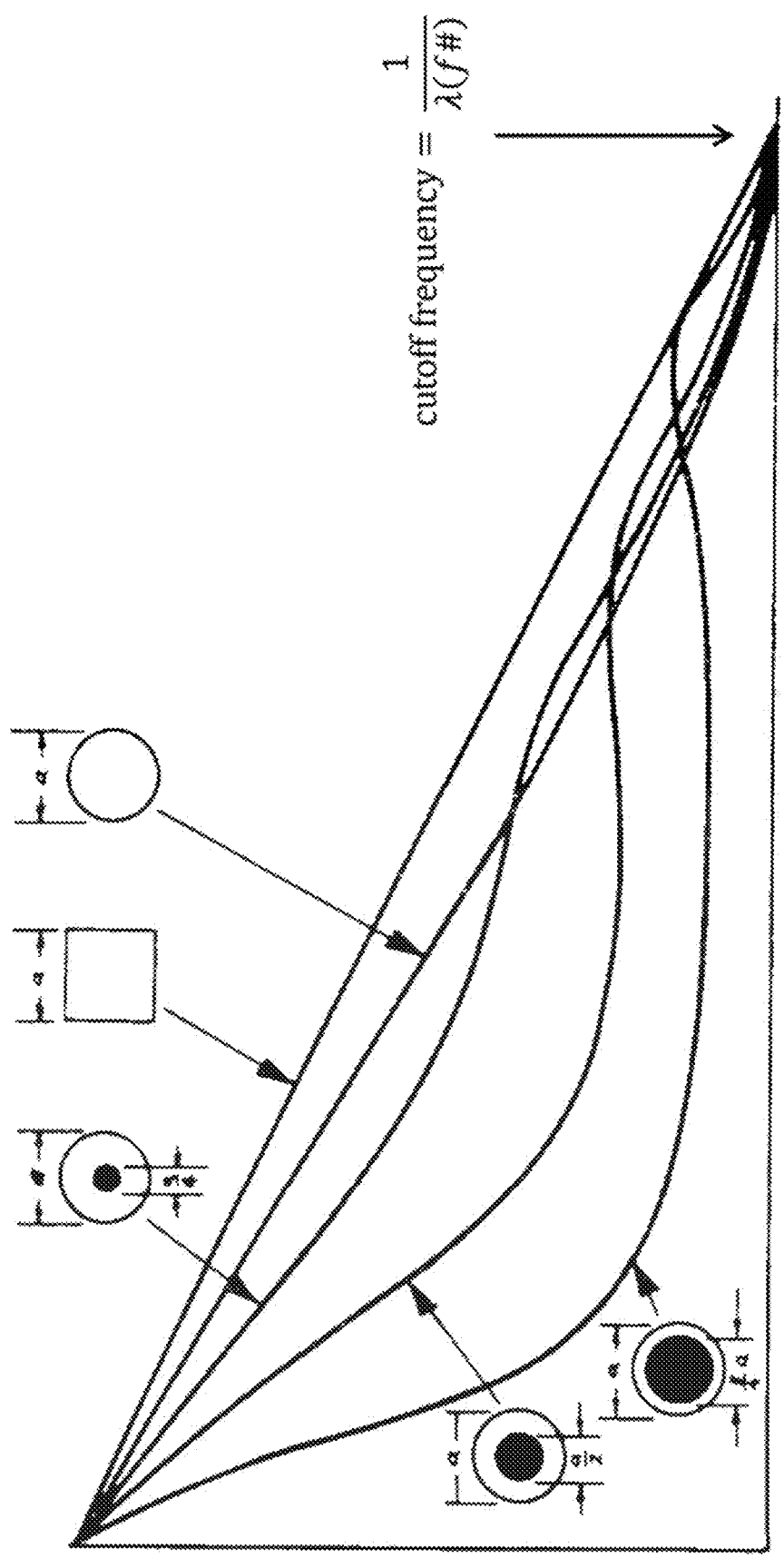
FIG. 11 (a) is a graph illustrating Diffraction-limited MTF for different apertures, for the purpose of explaining methods and apparatus of embodiments of the present technology.
Figure 11B:
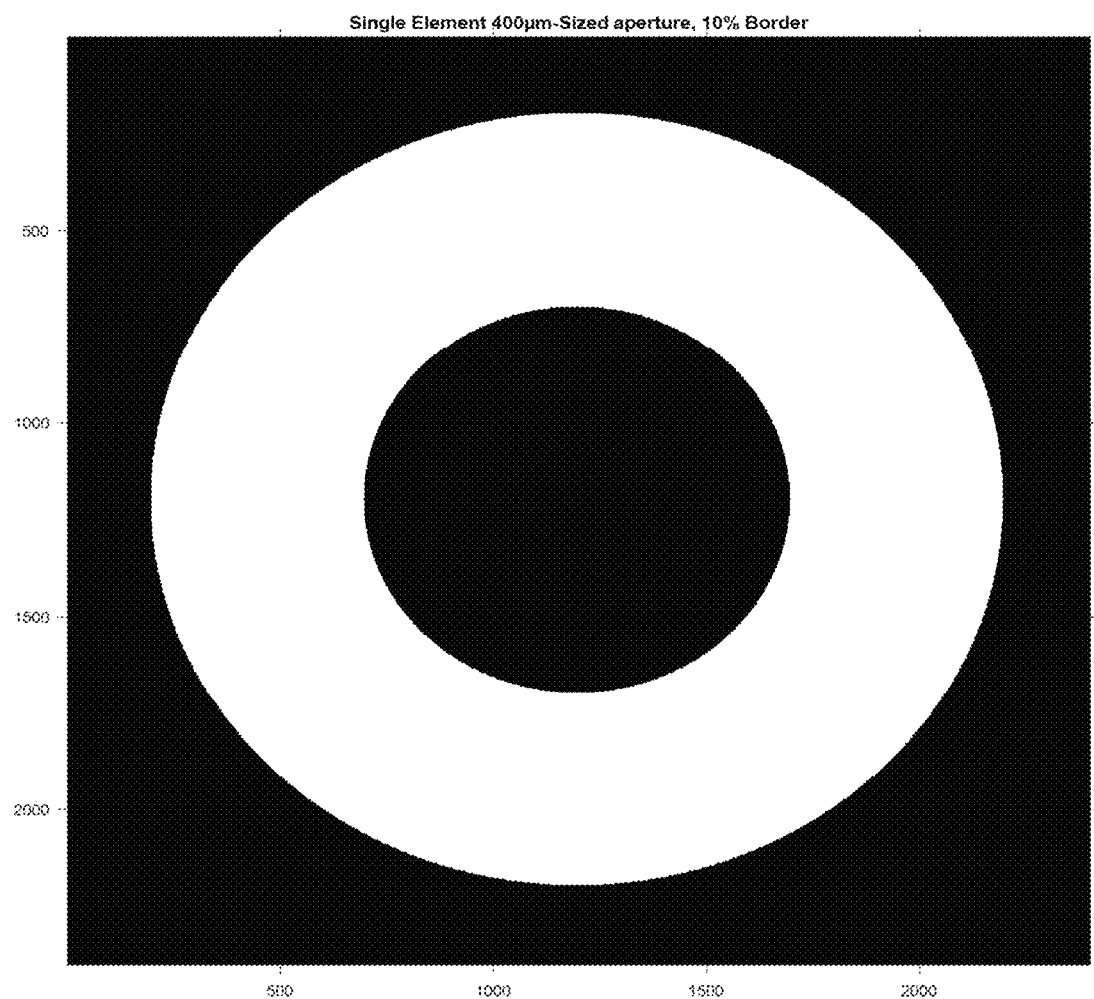

The Fourier transform approach therefore allows us to compute the MTF for any arbitrary pupil function we define. A case study from G. Boreman, Modulation Transfer Function in Optical and Electro-Optical Systems, SPIE, 2001, the entire contents of which is incorporated by reference as if fully set forth herein, is shown in FIG. 11a which is a diffraction-limited MFT for different apertures (Y axis representing the percentage of MTF and the x axis representing spatial frequency), where a small range of simple apertures are shown—circle, square, and obscured circular apertures of interest, a square aperture of sides a appears as a y=−x line above the MTF for a circular aperture of diameter a. On inspection one can see that the square contains a larger area, and thus is open to more spatial frequencies, which sum up to provide a flatter MTF response. A circle with the same area as the square would simply have a higher cut-off frequency (since a will increase), but still exhibit the same roll-off curve.

To model in a mathematical software package such as Matlab®, we begin with a model space and define the pixel sampling rates (resolution) representing each spatial point—e.g. 10 pixels per micron.

Scaling: Cut-off frequency for MTF can be derived from:

$$Fc = \frac{1}{\lambda F/\#} = \frac{D}{\lambda EFL} \quad (3)$$

Where F/#=EFL/D for EFL of human eye (~24.2 mm) and D the diameter of the aperture array—for the MTF scale, wavelength is expressed in mm (to provide lp/mm) and where EFL=Effective Focal Length (it is given above as about 24.2 mm)

For the diffraction plane, if the FFT array contains N pixels in one direction, then the frequency span is ±N/2 (this is fundamental to a frequency spectrum as per Nyquist's theorem). The spatial frequency scale is thus:

$$\Delta F = \frac{2D}{N\lambda EFL} \quad (4)$$

A point to note is that the spatial dimension of the diffraction pattern will not be the same scale as the original aperture/image due to being displaced by distance EFL. The spatial extent is the reciprocal of equation (4) given by:

$$x_{max} = EFL \frac{N\lambda}{2D} \quad (5)$$

with the spatial step size by:

$$\Delta x = EFL \frac{\lambda}{D} \quad (6)$$

The angular scale is easy to obtain by:

$$\theta_{max} = \tan^{-1}\left(\frac{x_{max}}{EFL}\right) = \tan^{-1}\left(\frac{N\lambda}{2D}\right) \quad (7)$$

For MTF we can also make lp/mm (LPS per mm) to lp/° conversion by:

$$lp/° = (lp/\text{mm}) \frac{x}{\theta} \quad (8)$$

Where x is the physical extent of the viewing width, and θ the angle subtended at the eye. This is useful when making comparisons to the angular resolution performance of a human eye.

Figure 11:
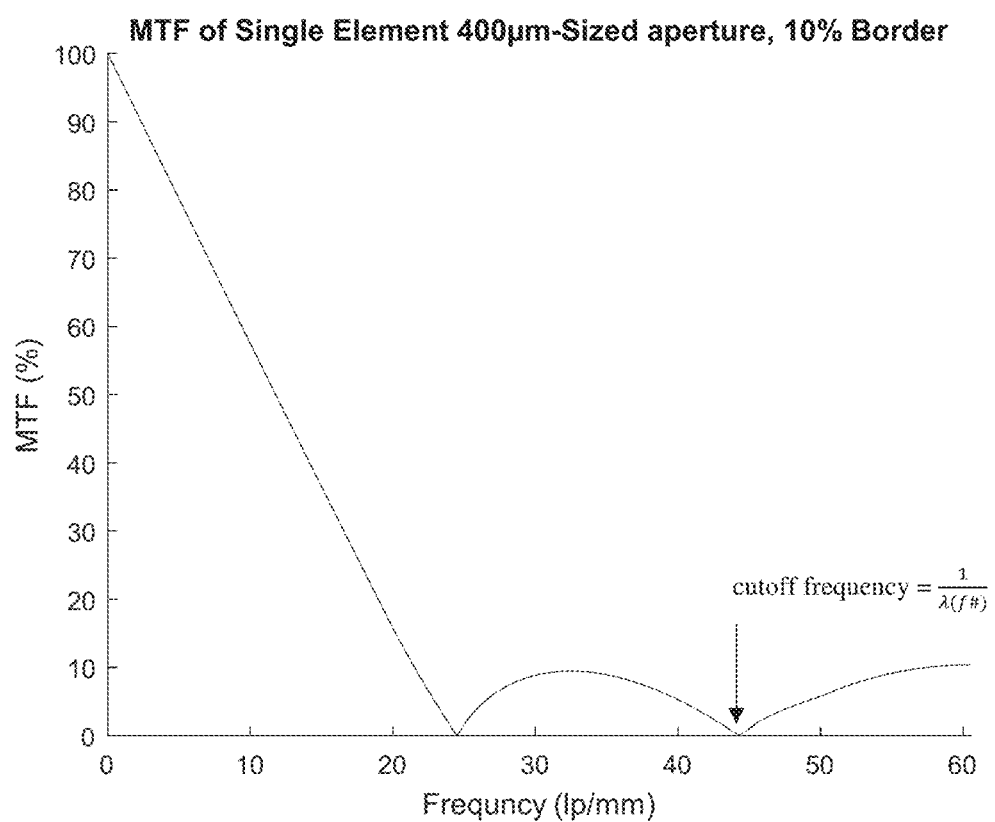
Figure 11:
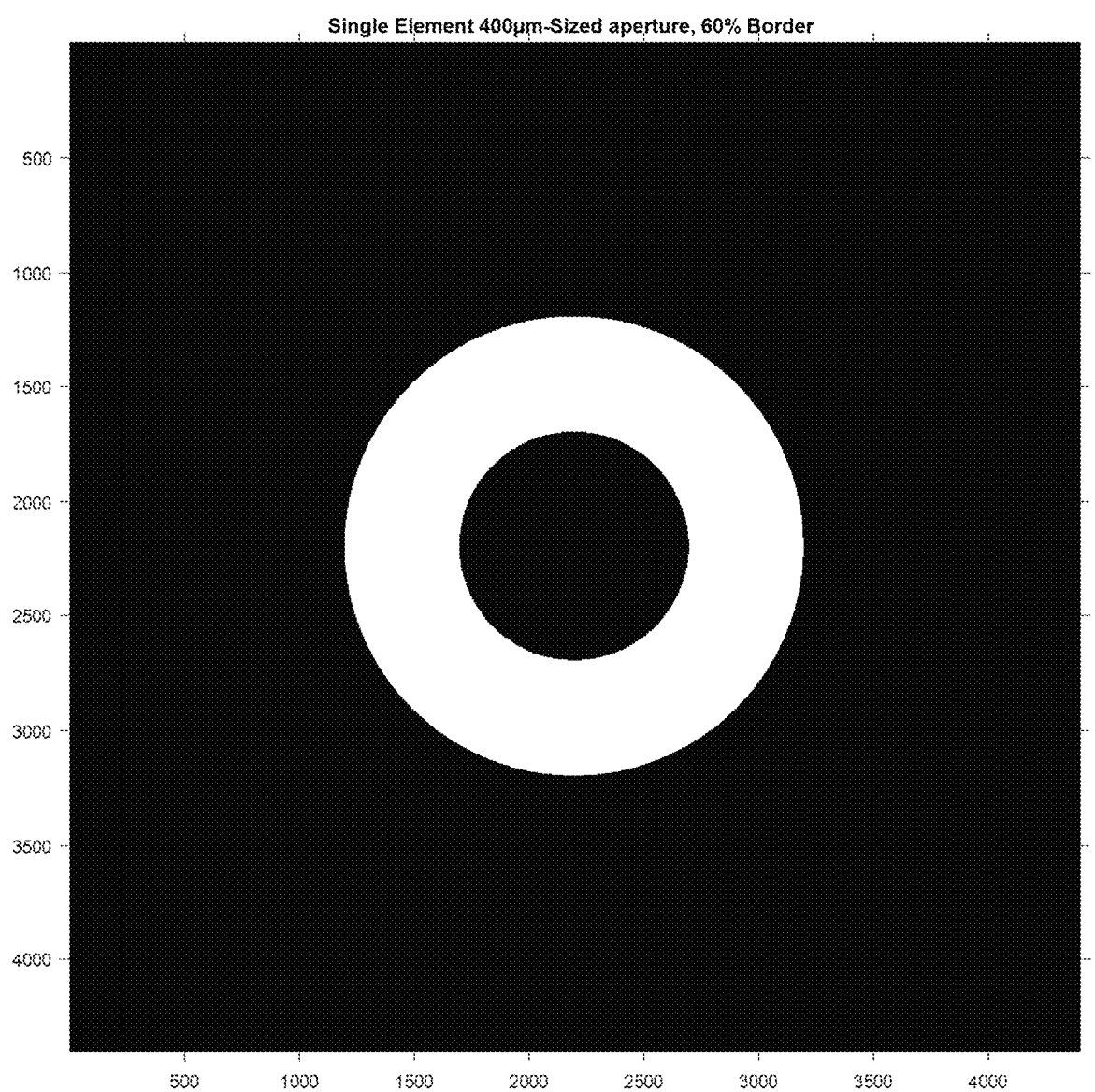

For computation of the FFT, it is important to provide a padding boundary proportional to the largest element size. Failure to do so results in erroneous detail below the cut-off frequency as the following FIGS. 11(*b*)-11(*e*) demonstrate:

FIG. 11 (*b*) illustrates a single element having a 400 µm aperture and a 10% border according to an embodiment which is the test feature for theoretical results from FIG. 11(*a*)—aperture with a/2 obscuration. FIG. 11 (*c*) illustrates the MTF virus frequency for the single element having a 400 µm and a 10% aperture of FIG. 11(*b*). FIGS. 11(*b*) and 11(*c*)

show the case of an aperture with insufficient array padding producing erroneous MTF detail below cut-off frequency.

Figure 11E:
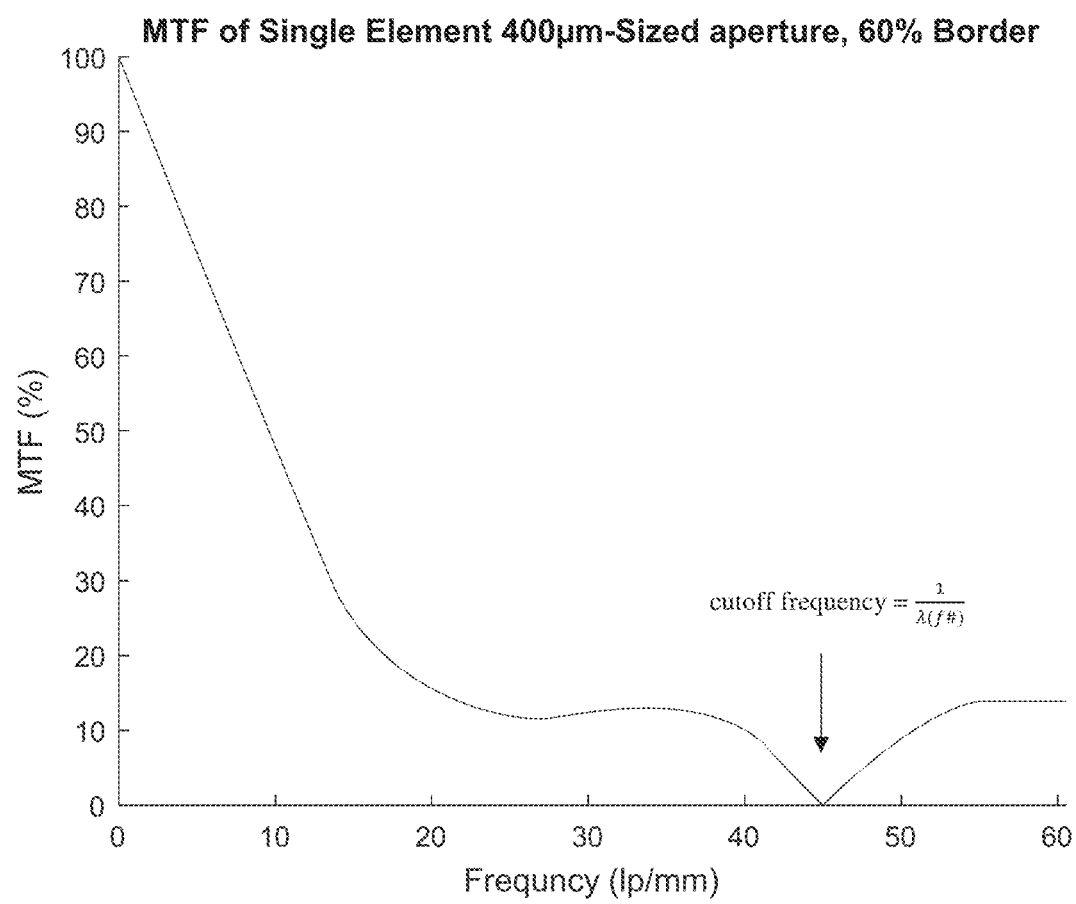

FIG. 11 (d) illustrates a single element having a 400 μm aperture and a 60% border according to an embodiment. FIG. 11 (e) illustrates the MTF virus frequency for the single element having a 400 um and a 60% aperture of FIG. 11(d). FIGS. 11(d) and 11(e) show the case of an aperture with suitable array padding producing with correct MTF profile below cut-off frequency, agreeing with theoretical plot FIG. 11(a). Thus, the effect of increasing FFT border padding >60% results in MTF profile that agrees with FIG. 11(a) aperture with a/2 obscuration.

Figure 12A:
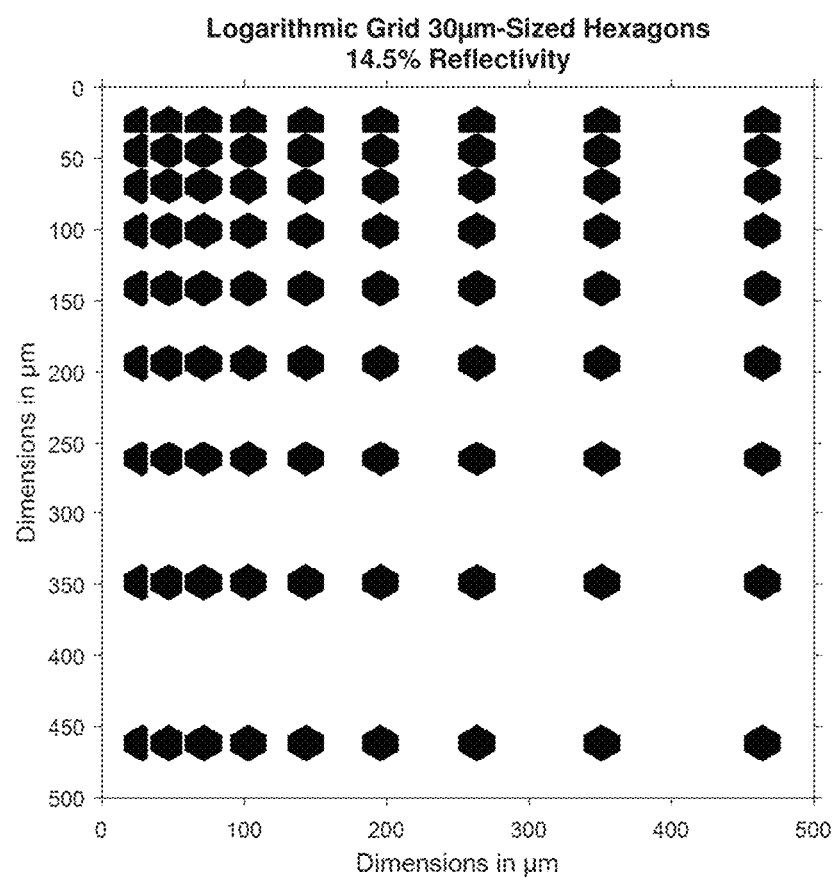
FIG. 12 (a) illustrates a logarithmic grid of 30 um-sized hexagons according to an embodiment.
FIG. 12(c) illustrates the diffraction of the logarithmic grid of FIG. 12(a)
Figure 12B:
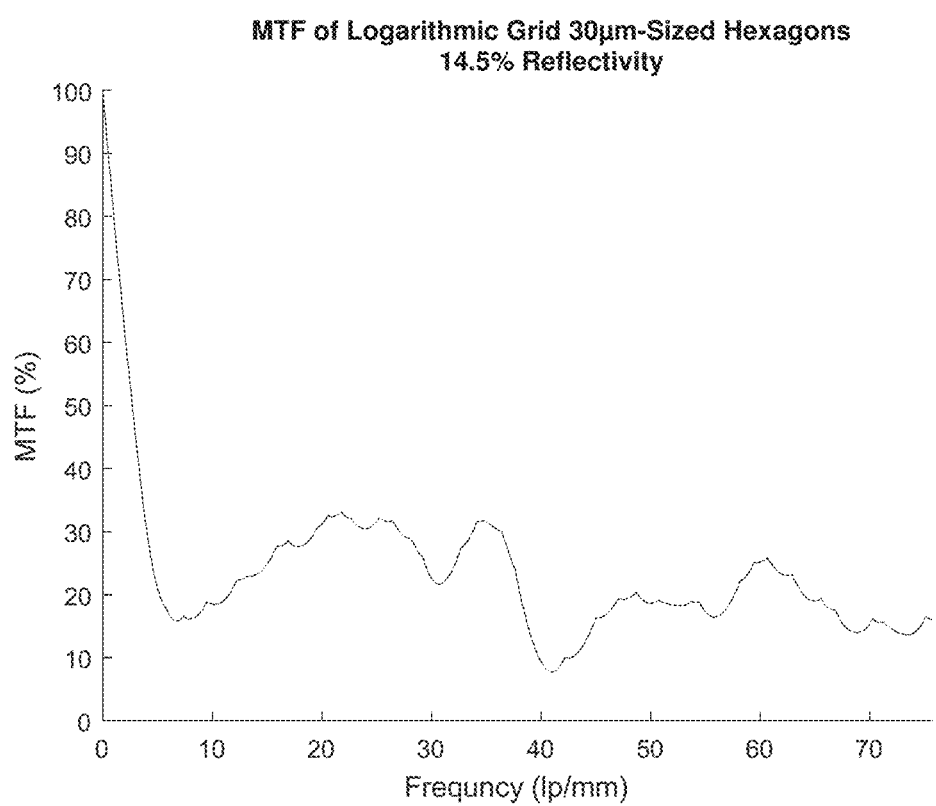
Figure 12:
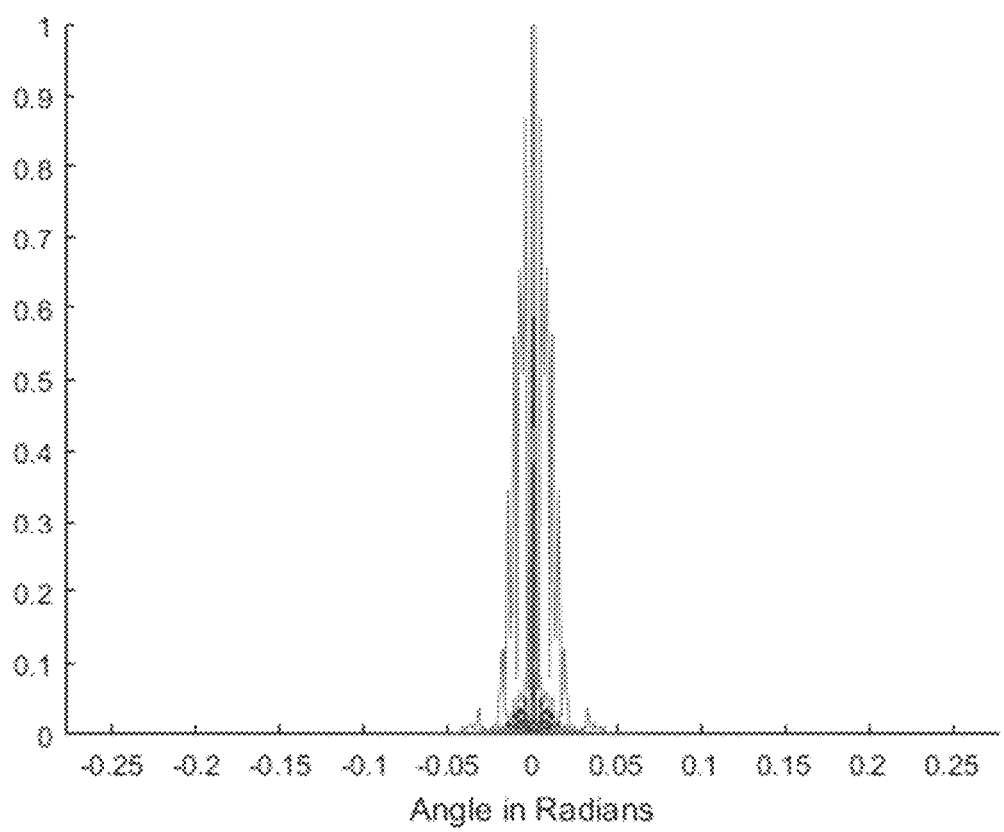

We can then extend this analysis to consider the effect of different shapes and arrangements upon MTF and diffraction, for example hexagonal shaped reflectors in a non-uniform distribution: FIG. 12 (a) illustrates a logarithmic grid of 30 um-sized hexagons according to an embodiment. The grid has a 14.4866% reflectivity and 157 elements. FIG. 12 (b) illustrates the MTF versus frequency of the logarithmic grid of FIG. 12(a). FIG. 12(c) illustrates the diffraction of the logarithmic grid of FIG. 12(a).

The following problem has been identified. At least some embodiments allow an image to be redirected by sub-eye-pupil-sized reflective regions towards the human eye, by virtue of this limitation on size, it requires careful distribution of reflective regions in order to minimize artefacts such as diffraction and degradation in MTF and image intensity.

The technical solution has been provided. To date there have been no known attempts to generate reflective surfaces for imaging using patterns of sup-pupil sized reflective dots/shapes in near-eye displays. This application covers new patterning shaping techniques to address. Additional novelty comes from the application of acutance, a metric for determine subjective image sharpness in camera systems— based upon MTF—to displays.

MTF Optimization begins by understanding the consequences of using such small reflective elements upon MTF as evidenced by the cut-off frequency in equation (3). The human eye can typically just about resolve angular frequencies of up to 30 cycles/8 for a pupil diameter of 2-3 mm (see A. Guirao et al, "Average Optical Performance of the Human Eye as a Function of Age in a Normal Population", pp 203-213, OKS, January 1999, Vol. 40, No. 1, the entire contents of which is incorporated by reference as if fully set forth herein) (corresponding to 1 arcmin of detail), but peaks at 8 cycles/θ. This suggests a peak of 19 lp/mm and cut-off at 71 lp/mm.

Equation (3) suggests a sub-pupil reflector size of no larger than 0.5 mm would be adequate to reflect the full detail of a computer-generated image. Projector displays are however themselves fundamentally more limited in resolution. A conventional LCOS projector design with polarization optics and collimating mirror (well known in the field) can typically achieve at best 9 lp/θ—this is mainly due to optical and opto-mechanical constraints rather than display panel resolution alone.

The optimization can then be improved more relevantly to the human eye response by calculating the acutance. This is the perceived sharpness by the human eye of an image relative to it's brightness, (see C. W. a. O. Becklund, Introduction To The optical Transfer Function, SPIE, 2010 which is incorporated herein in its entirety, and Documentation—Current v5.2, Acutance and SQF (Subjective Quality Factor), published by Imatest® at http://www.imatest-.com/docs/sqf/, which is which is incorporated herein in its entirety).

This relatively new metric is used for camera imaging systems to compare lens performance against the human eye, so this is a new application of the metric, to date the first application, for display imaging as well as HMDs.

$$\text{Acutance } A = \frac{\int_0^f MTF(f)CSF(f)df}{\int_0^f CSF(f)df} \tag{9}$$

Where CSF(f) is the contrast sensitivity function of the human eye, f is the upper bound of the frequency range being considered (units cycles/θ)—either the maximum frequency supported by the eye or the maximum frequency of the reflective aperture, whichever is higher.

Minimization of Diffraction

We note from the diffraction curve that Integrating from the origin outwards whilst multiplying piece-wise by the current radial co-ordinate r, gives a weighted area under the modulus of the diffraction curve such that the more energy (light) there Is at the outer edges, the higher the resulting value of the integration. This forms the basis of a numerical metric by which diffraction can be minimized—in the ideal case of all light energy being un-diffracted, the light will be at the origin, where r=0, so that the diffraction integrand yields 0.

$$D(r)=\iint_0^{2\pi} r FFT|P(x,y)|dr d\theta \tag{10}$$

Optimal Patterns for Sub-Pupil Reflectors

It is shown that diffraction is minimized when there are no two Identical point sources within a pupil sampling region. It Is also shown that MTF Is higher when the reflective dots are larger. It is therefore possible to create a range of shapes that is non-periodic in shape and distribution, whilst allowing for a given length.

Figure 13:
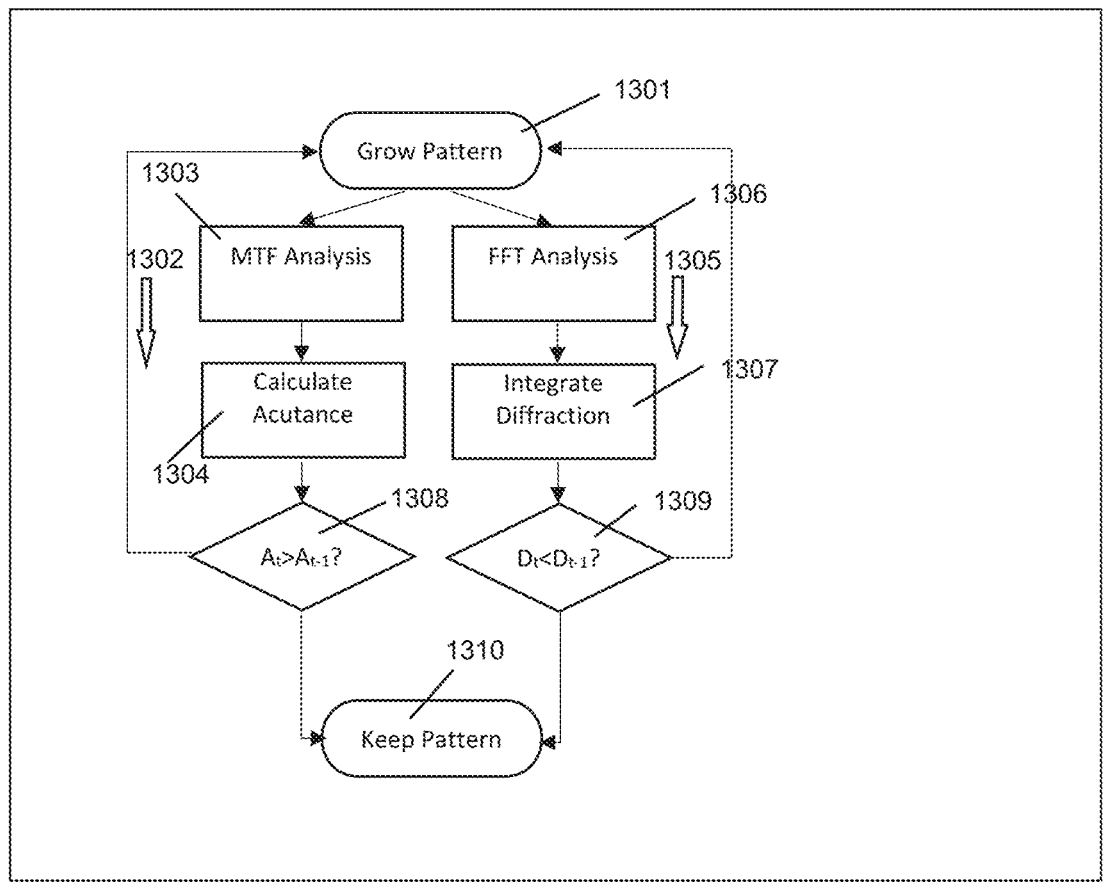
FIG. 13 illustrates a method of generating patterns of sub-pupil reflectors according to one embodiment.
Figure 14:
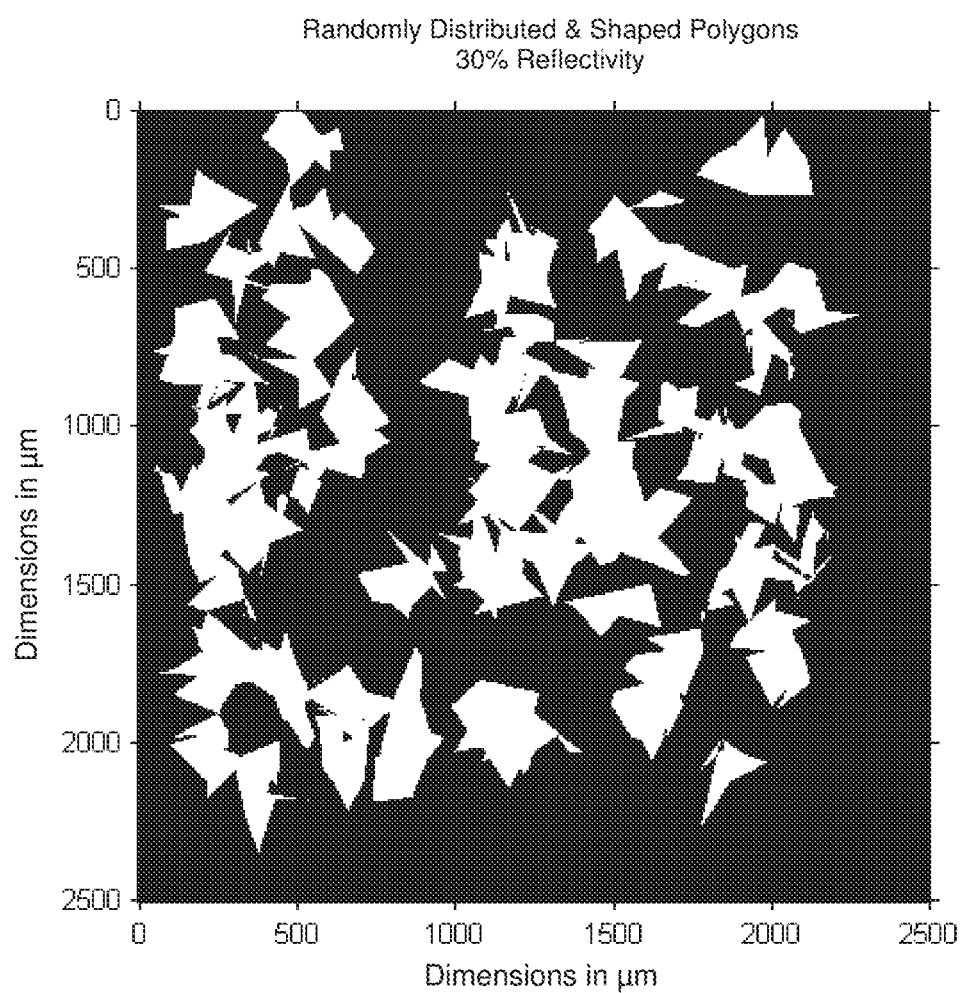
FIG. 14 illustrates an example pattern of distributed reflector dot shapes offering high performance generated by the pattern generation method of FIG. 13 according to an embodiment.
Figure 15:
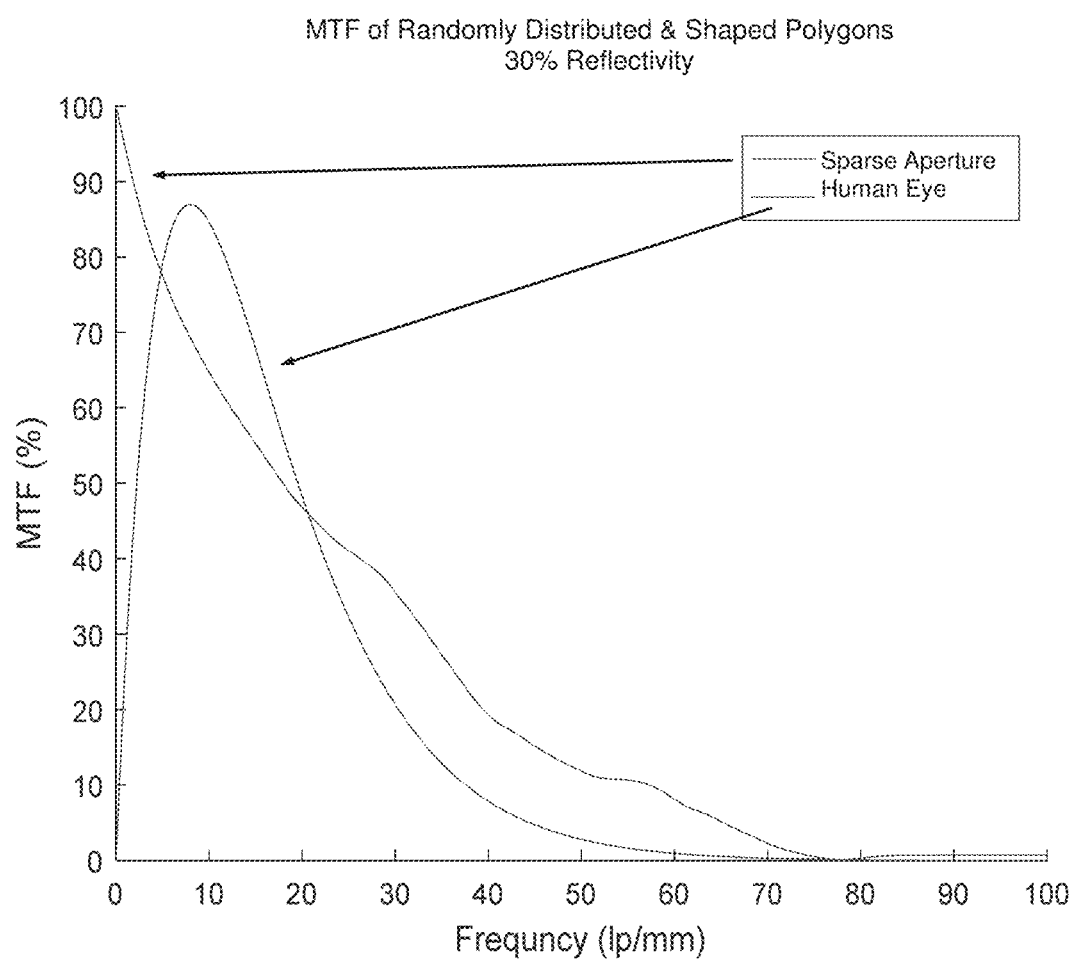
FIG. 15 illustrates the MFT versus special frequency for the generated pattern of reflector dots of FIG. 14 (sparse aperture reflector) as compared to the MFT versus spatial frequency for a human eye.
Figure 16:
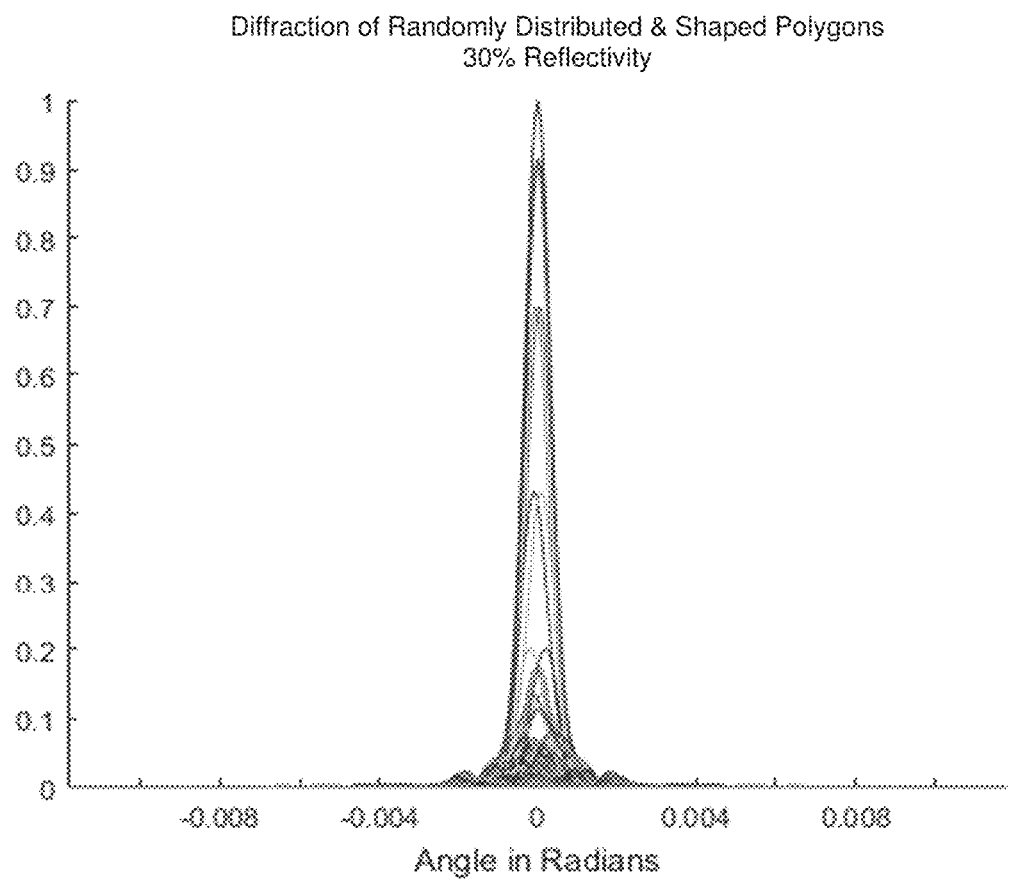
FIG. 16 illustrates the net diffraction of the random elements of FIG. 14 by showing relative intensity versus angle for the whole 2.5 mm×2.5 mm pupil window.

If the pattern generation allowed for adding of random points besides random locations, one can find distributed reflector shapes such as those below offering very high performance: FIG. 14 illustrates an example pattern of distributed reflector dot shapes according to an embodiment offering high performance generated by the pattern generation method of FIG. 13 allowing for adding of random points besides random locations. The pattern comprises randomly distributed 100 um-400 um sized random polygons. The reflectivity of the grid is 30% and there are 80 elements (polygons). FIG. 15 illustrates the MFT versus special frequency for the generated pattern of reflector dots of FIG. 14 (sparse aperture reflector) as compared to the MFT versus special frequency for a human eye. FIG. 16 illustrates the diffraction of the random elements of FIG. 14 by showing reflectivity versus angle.

For the optimization strategies we also note two well-known psychovisual principles:

Changes in brightness are more important than changes in color: the human retina contains about 120 million brightness-sensitive rod cells, but only about 6 million color-sensitive cone cells. Low-frequency changes are more important than high-frequency changes. The human eye is good at judging low-frequency light changes, like the edges of objects. It is less accurate at judging high-frequency light changes, like the fine detail in a busy pattern or texture. Camouflage works in part because higher-frequency patterns disrupt the lower-frequency edges of the thing camouflaged. This suggests additional strategies based upon:

1. Quasi-continuous reflector shapes (as per Turing growth model)

2. Partially reflective distributions that have reflective coatings (dielectric) optimized for specific colors and angles such that a greater net reflective area is achieved.

Figure 18:
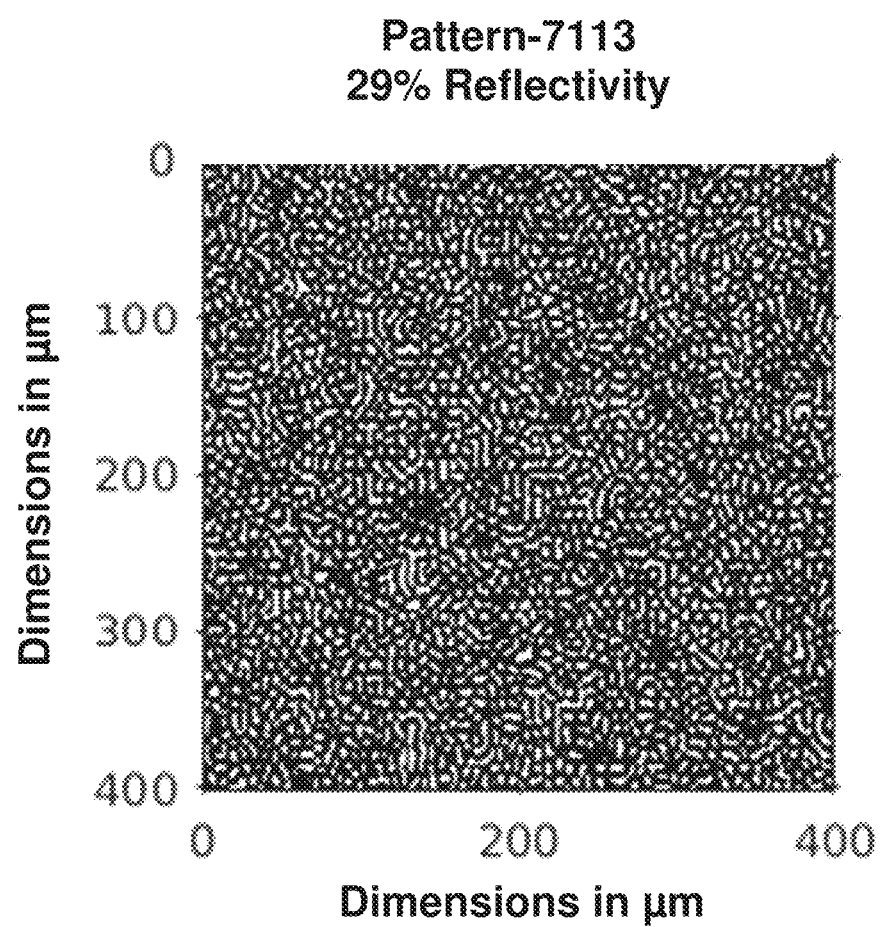
FIG. 18 illustrates a grown pattern reflector according to an embodiment generated by the method of FIG. 13 modified by utilization of FIG. 17, modified by varying the production degradation and diffusion parameters.

In some embodiments, the most useful method Is that of application of the Turing Reaction Diffusion model to allow pattern "growth" In a pseudo random environment. It Is named after Alan Turing and was originally used to describe pattern formation such as animal camouflage in a mathematical way. FIG. 13 illustrates such a method of optimizing pattern growth that can be used for generating patterns of sub-pupil reflectors according to one embodiment. Once the grow pattern 1301 is initially provided (by way of none limiting example, FIG. 14 or 18 gives an example starting point for the distribution to grow a pattern), both first process 1302 and second process 1305 proceed. In some embodiments, the first process and second process are performed in series but in other embodiments may be performed in parallel. Separate outputs and calculations are provided for process 1302 and 1305, respectively. Process 1302 comprises performing MFT analysis in step 1303. Thereafter, process 1302 comprises calculating acutance A in step 1304 (see equation 9). If the acutance At calculated in step 1304 is greater than current highest value At−1 (see step 1308), it is possible the pattern might be kept (see step 1310). Otherwise if the calculated acutance At is not greater than At−1 (see step 1308), the first process returns to the step of providing a grow pattern 1301 and the process starts again. Second process 1305 comprises performing FFT analysis in step 1306 (see equation 10) Thereafter, process 1305 further comprises calculating diffraction D (r). In some embodiments, this may be integrated diffraction and/or radially weighted (see step 1307). If D (r) calculated in step 1307 is less than current lowest value Dt−1 (see step 1309), the growth pattern provided in step 1301 is kept/selected for use as a pattern of reflective dots in the optical combiner (assuming first process 1302 also results in a determination that the same pattern may be kept ((see steps 1304, 1307, 1310)) otherwise if the calculated diffraction Dt is not less than Dt−1 (see step 1309), the second process returns to step of providing a grow pattern 1301 and the process then starts again. Here t is present time and t−1 is previous time. Thus, the growth pattern for use with the optical combiner is selected when both At is greater than At−1 and Dt less than Dt−1. Optical combiners having reflective dots arranged according to the selected growth pattern reduce artefacts such as diffraction and degradation in MTF and image intensity compared to existing optical combiners.

Growth-Patterned Reflectors (Turing Diffusion Algorithm)

Reference will be now made in more detail to the Reaction-diffusion modelling process that may adopted according to some approaches of the present technology to grow patterns of the reflective dots for fabrication of growth-pattern reflectors.

Figure 17:
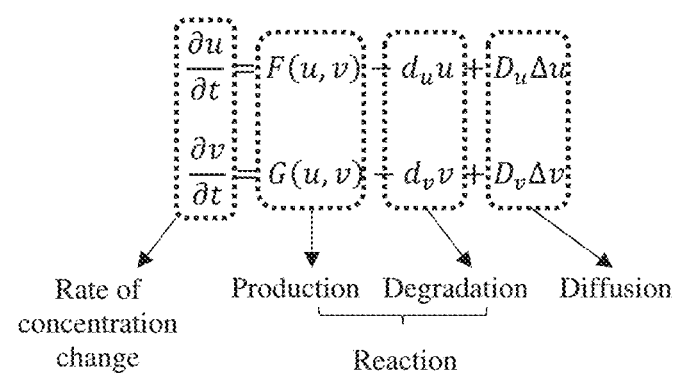
FIG. 17 as an equation diagram illustrating the Basis of Turing diffusion equations for pattern growth.

A basic explanation can be found in Kestrels and Cerevisiae, Histories of Science from Kele W. Cable, Alan Turing's Reaction-Diffusion Model—Simplification of the Complex, published Dec. 1 2010, (https://phylogenous.wordpress.com/2010/12/01/alan-turings-reaction-diffusion-model-simplification-of-the-complex/) the entire contents of which is incorporated by reference as if fully set forth herein—a range of different asymmetrical patterns can be grown in a controlled way. The asymmetry is exploited to reduce diffractive effects. FIG. 17 is an equation diagram illustrating the Basis of Turing diffusion equations for pattern growth taken from Kestrels and Cerevisiae according to an embodiment.

FIG. 17 outlines the principle mathematical relations that give rise to a reaction-diffusion process for pattern formation, as originally defined by Alan Turing in his 1952 paper "The chemical basis of morphogenesis" (see Article: The chemical basis of morphogenesis, Alan Mathison Turing, Published: 14 Aug. 1952 https://doi.org/10.1098/rstb.1952.0012, Volume 237, Issue 641 Published by: Royal Society, the entire contents of which is incorporated by reference as if fully set forth herein). It is a two-component reaction-diffusion system, whereby two homogeneously distributed reactive compounds (termed "morphogens"), u and v, occupy a certain space (in our case a pupil-sized area for example). Both morphogens can spread away (or "diffuse") from where they are originally produced in the tissue (we start the process with a random distribution). One morphogen, u diffuses slowly, and serves as an activator of development at nearby sites. The second morphogen, v, is an inhibitor of the first, and spreads more rapidly from where it originated, thus acting at longer ranges. It is the interaction (or "reaction") of these two morphogens that allows for the autonomous generation of spatial patterns during development. The rate of spreading is determined by the diffusion coefficient Du and Dv, and Laplacian spatial operators Δu and Δv, for activator and inhibitor respectively. The reaction comprises both production, governed by F(u,v) and G(u,v), and degradation governed by $d_u$u and $d_v$v. We obtain F(u,v) and G(u,v) for non-linear dynamical systems (See Physica A: Statistical Mechanics and its Applications Volume 419, Feb. 1, 2015, Pages 487-497, Pattern formation and Turing instability in an activator-inhibitor system with power-law coupling, F. A. dos S. Silva R. L. Viana S. R. Lopes, https://doi.org/10.1016/j.physa.2014.09.059, Elsevier, the entire contents of which is incorporated by reference as if fully set forth herein):

$$f(u, v) = \rho_u \frac{u^2}{v} \quad (11)$$

$$g(u, v) = \rho_v u^2$$

Where $\rho_u$ and $\rho_v$ are the activator and inhibitor production rates respectively. Examples of alternative reaction-diffusion growth models can be found in for example in Hearn D J (2019) Turing-like mechanism in a stochastic reaction-diffusion model recreates three dimensional vascular patterning of plant stems. PLoS ONE 14(7): e0219055. https://doi.org/10.1371/journal.pone.0219055, the entire contents of which is incorporated by reference as if fully set forth herein, which also yield similar patterns.

In some other embodiments, other reaction-diffusion models may be adopted. Furthermore, other types of growth patterns may be adopted in other embodiments.

Figure 19:
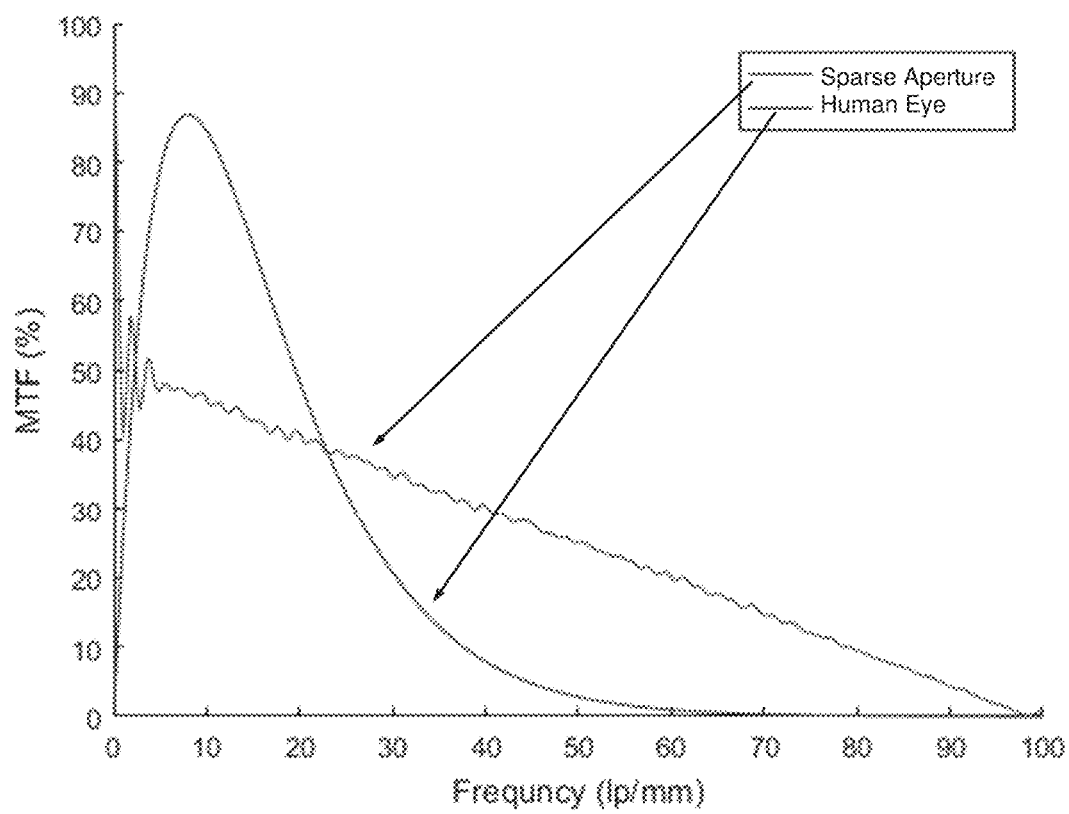
FIG. 19 illustrates the MFT versus special frequency for the generated pattern of reflector dots of FIG. 18 (sparse aperture reflector) as compared to the MFT versus special frequency for a human eye.
Figure 20:
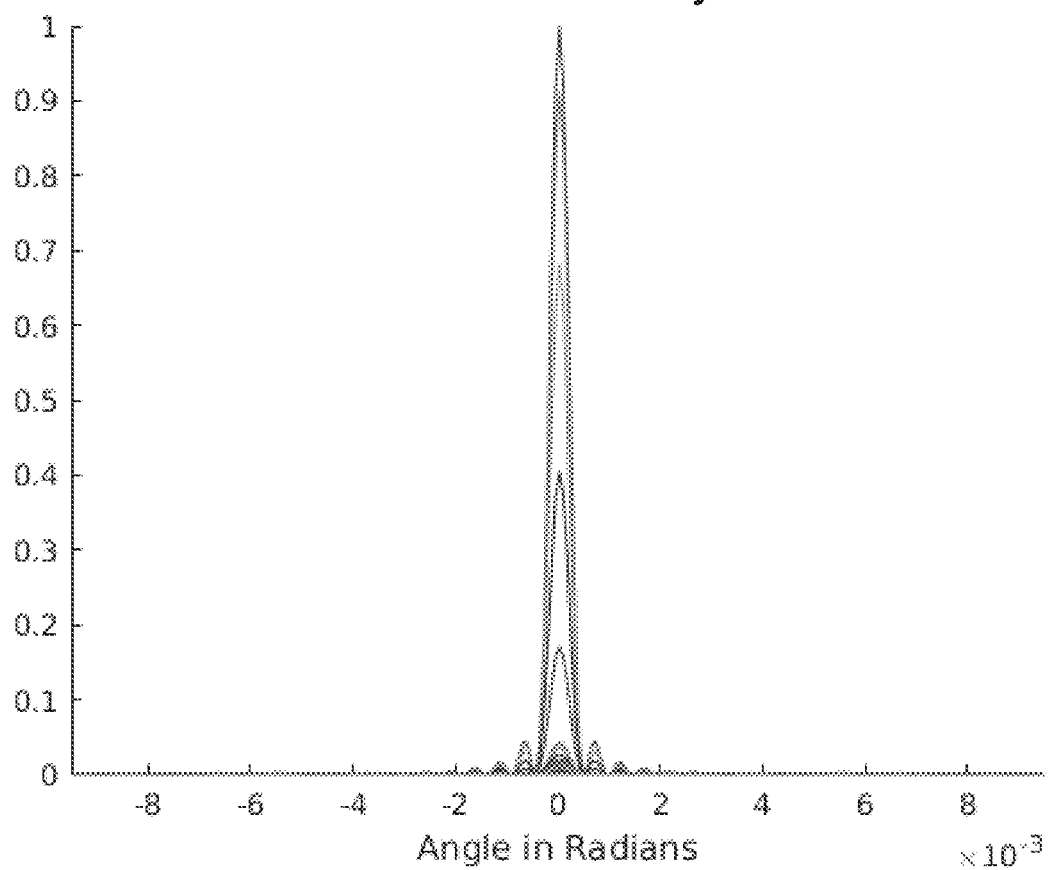
FIG. 20 illustrates the diffraction of the random elements of FIG. 18 by showing reflectivity versus angle.
Figure 21:
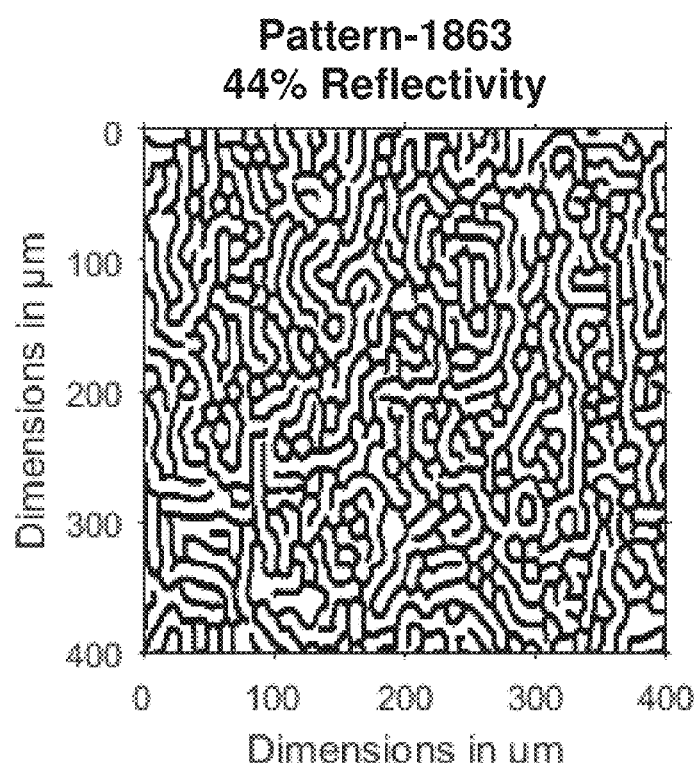
FIG. 21 illustrates a grown pattern reflector according to another embodiment generated by the method of FIG. 13 modified by utilization of FIG. 17, modified by varying the production degradation and diffusion parameters.
Figure 22:
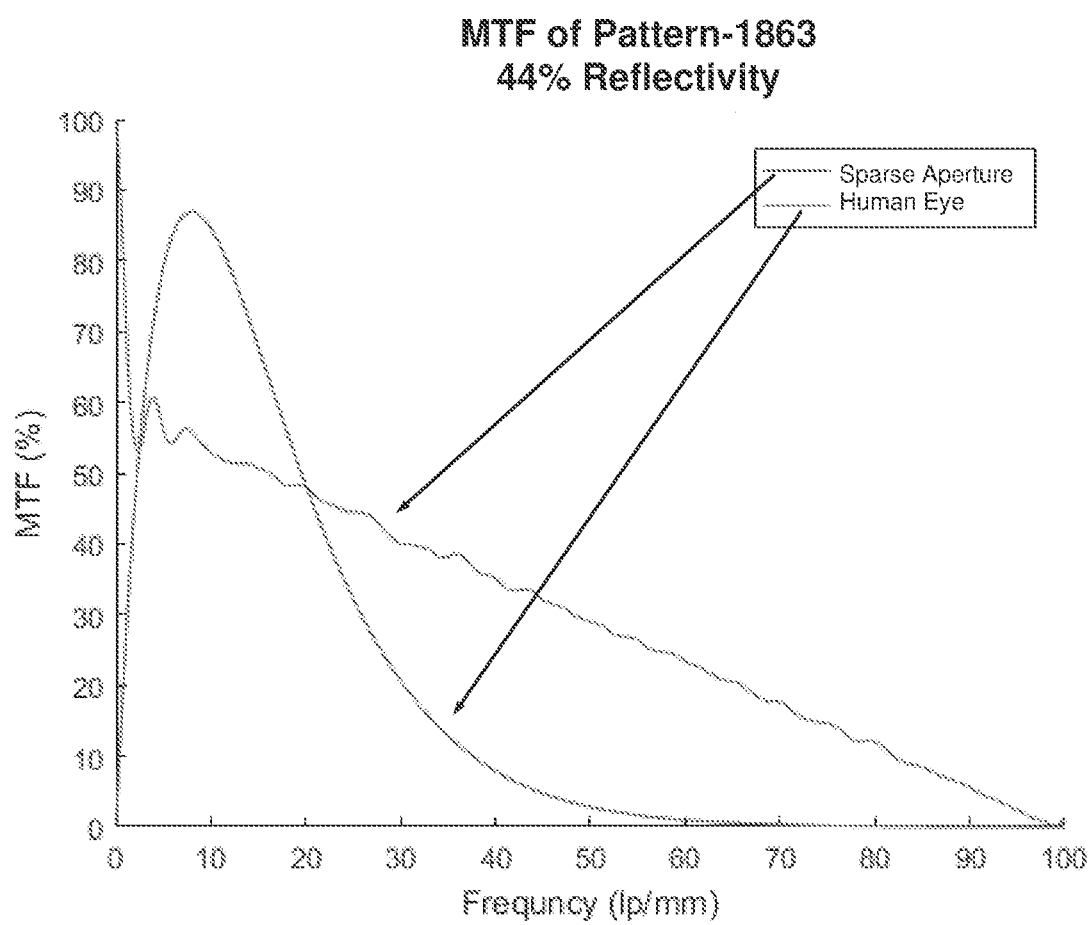
FIG. 22 illustrates the MFT versus special frequency for the generated pattern of reflector dots of the reflector of FIG. 21 (sparse aperture reflector) as compared to the MFT versus special frequency for a human eye.
Figure 23:
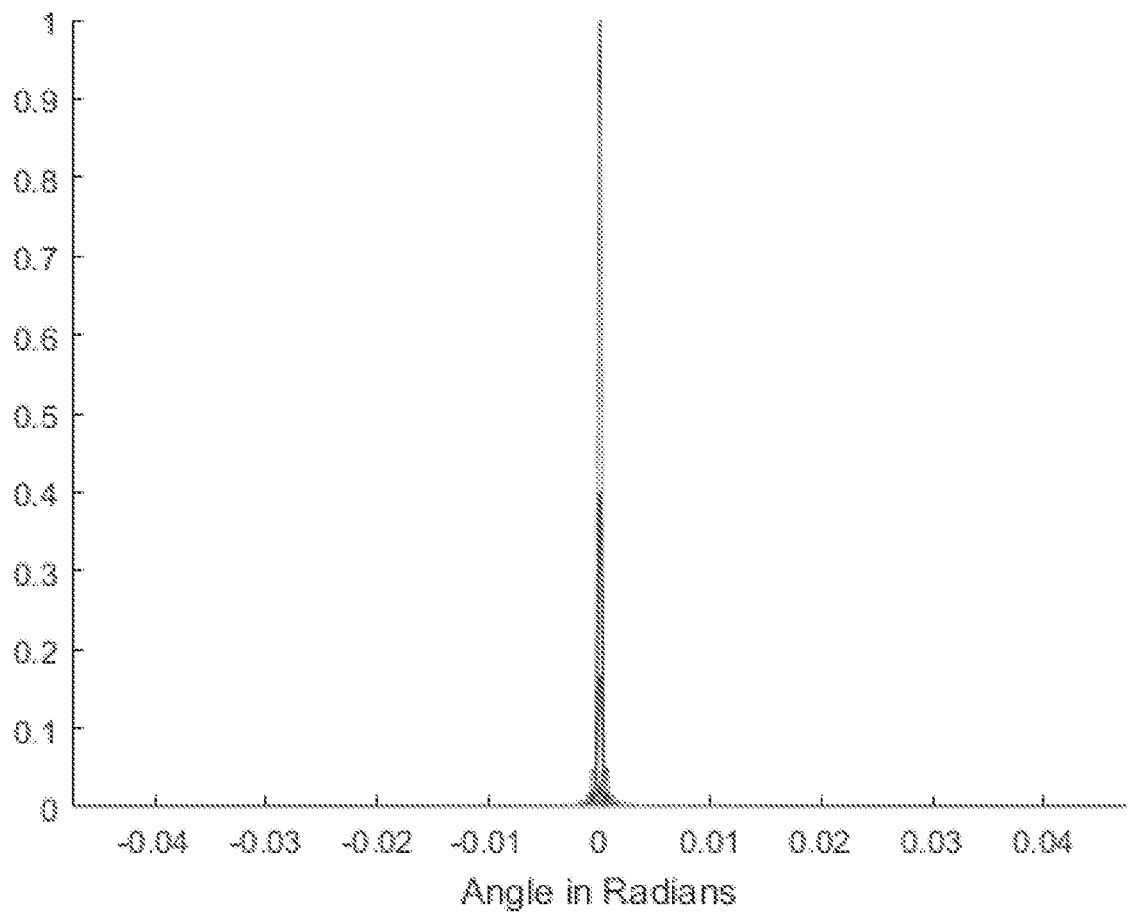
FIG. 23 illustrates the diffraction of the random elements of FIG. 21 by showing reflectivity versus angle.

FIGS. 18 to 23 illustrate examples of growth pattern reflectors generated using the method of FIG. 13 modified by utilization of FIG. 17, modified by varying the production degradation and diffusion parameters. FIG. 18 illustrates a grown pattern reflector with reflectivity 29% FIG. 19 illustrates the MFT versus special frequency for the generated pattern of reflector dots of FIG. 18 (sparse aperture reflector) as compared to the MFT versus special frequency for a human eye. FIG. 20 illustrates the diffraction of the random elements of FIG. 18 by showing reflectivity versus angle. FIG. 21 illustrates a grown pattern reflector with reflectivity 44%. FIG. 22 illustrates the MFT versus special frequency for the generated pattern of reflector dots of the reflector of FIG. 21 (sparse aperture reflector) as compared to the MFT versus special frequency for a human eye. FIG. 23 illustrates the diffraction of the random elements of FIG. 21 by showing reflectivity versus angle. Comparing the MTF plot of FIG. 22 to FIG. 19, we see the MTF response is far less sensitive to net reflectivity than would be the case with simple geometric shapes, showing the utility of such asymmetric and filamentary patterning.

Whilst the growth model based on the Turing reaction diffusion model described above (and also other reaction-diffusion models of the embodiments) has at least 2 compounds for reaction (u, v), in other embodiments there may be more than 2 compounds such as but not limited to 3 and 4 compounds for modelling the reactions which yield a pattern.

In other aspects the present technology, the pattern of reflective dots is provided by way of utilizing growth pattern models that are not necessarily a Turing reaction model a reaction diffusion model. In some embodiments a growth pattern model is based on a reaction diffusion modelling process. In some embodiments, the reaction diffusion model process is initiated from a random seed using random numbers of degradation and diffusion parameters over certain ranges found empirically to give a certain cluster. By way of none limiting example, FIG. 14 or 18 gives an example starting point for the distribution to grow a pattern of reflective dots. In some embodiments, the diffusion parameter is fixed and in some other embodiments the diffusion parameter iterates through. In some embodiments, production and degradation coefficients are varied randomly by a few percent to provide a catalyst or population. FIG. 13 illustrates a method of optimizing pattern growth that can be used for generating patterns of sub-pupil reflector dots according to some embodiments and which utilizes a reaction diffusion modelling process such as but not limited to the reaction-diffusion process represented in FIG. 17.

According to aspects of the present technology, the pattern(s) of reflective dots in an optical combiner or optical waveguide are determined according to methods for generating patterns of reflective dots according to any one or more embodiments described herein with reference to FIGS. 11 to 23.

In some embodiments, the pattern(s) of reflective dots in common or distinct planes of any one or more of the embodiments of optical wave guides or systems 100, 200, 300, 400, 600, 700 and 800 described herein with reference to FIGS. 1 to 10 are determined according to methods for generating patterns of reflective dots according to any one or more embodiments of described herein with reference to FIGS. 11 to 23.

For example, in some embodiments, the pattern of reflective dots 108 of any one or more of the sparse aperture reflectors 215, 220, 225, 230 of the optical combiner 200 of FIG. 2 is determined according to any one or more of the methods for generating patterns of reflective dots according embodiments described herein with reference to FIGS. 11 to 23. In some embodiments, one or more of the sparse aperture reflectors 215, 220, 225, 230 is a growth pattern reflector whereby the pattern of reflector dots is determined in accordance with any one of the embodiments of the method of growing patterns described herein including the embodiment(s) described with reference to FIG. 13 modified by utilization of FIG. 17, modified by varying the production degradation and diffusion parameters Also, by way of example, in some embodiments, the pattern of reflector dots of sparse aperture reflector 330 of FIG. 3 is determined according to any one or more of the methods for generating patterns of reflective dots according embodiments described herein with reference to FIGS. 11 to 23. In some embodiments, one or more of the sparse aperture reflectors 330 is a growth pattern reflector whereby the pattern of reflector dots is determined in accordance with any one of the embodiments of the method of growing patterns described herein including the embodiment(s) described with reference to FIG. 13 modified by utilization of FIG. 17, modified by varying the production degradation and diffusion parameters. By way of example each black square illustrated in FIG. 3A can correspond to a plurality of reflective dots arranged in a pattern corresponding to a growth pattern provided according to any one of the methods of growing patterns of reflective dots set forth herein. For example, each black square illustrated in FIG. 3A may be a plurality of reflective dots arranged according to a growth pattern such as but not limited to the growth pattern grid shown in FIG. 18 or 21.

Also, further by way of example, in some embodiments, the pattern of reflector dots 108 in any one or more of the distinct planes 115, 120, 125, 130 of optical combiner 100 is determined according to any one or more of the methods for generating patterns of reflective dots according embodiments described herein with reference to FIGS. 11 to 23. In some embodiments, the pattern of reflective dots 108 in any one or more of the common or distinct planes of 115, 120, 125, 130 of optical combiner 100 is a growth pattern determined according to any one or more of the methods of growing patterns described herein including the embodiment(s) described with reference to FIG. 13 modified by utilization of FIG. 17, modified by varying the production degradation and diffusion parameters;

Yet furthermore, in some embodiments, the pattern of reflector dots in any one or more of the distinct planes of an optical combiner including distinct plane 1000 of FIG. 10 is determined according to any one or more of the methods for generating patterns of reflective dots according embodiments described herein with reference to FIGS. 11 to 23. In some embodiments, the pattern of reflective dots 108 in any one or more of the common or distinct planes including distinct plane 1000 is a growth pattern determined according to any one or more of the methods of growing patterns described herein including the embodiment(s) described with reference to FIG. 13 modified by utilization of FIG. 17, modified by varying the production degradation and diffusion parameters According to some aspects of the present technology, any one of the methods of arranging the reflective dots in the grown patterns in the optical substrate can be used in further optimization strategies for optical combiners.

For optical waveguides, the ray angles that make up an image need to be maintained relative to each other, for this the reflective planes, i.e. planes containing the patterns need to be parallel to each other. For manufacturing convenience, they are limited to a series of distinct parallel planes, but as long as each reflective element was parallel to each other, they could be distributed anywhere, subject to optimization (see by way of example FIG. 9).

According to yet other aspects any of the optical combiners of the embodiments disclosed herein is constructed by a process in which the optically reflective sub-pupil dots are arranged in a pattern corresponding to a pattern grown by any one of the aforementioned pattern growth models. Non-limiting examples of constructing optical combiners are set forth above with reference to FIGS. 3A, 3B and 4A & 4B.

Unique Features of at least some embodiments allow waveguide imaging with small reflective features (dots) that can have absorption or antireflective coatings to suppress secondary Image formation, where difficulties and artefacts arise with conventional dielectric coatings at higher angles of Incidence.

New techniques to determine optimal reflector configurations with greatly improved imaging resolution (MTF) more suited to human vision, and reduced diffraction effects.

Figure 24:
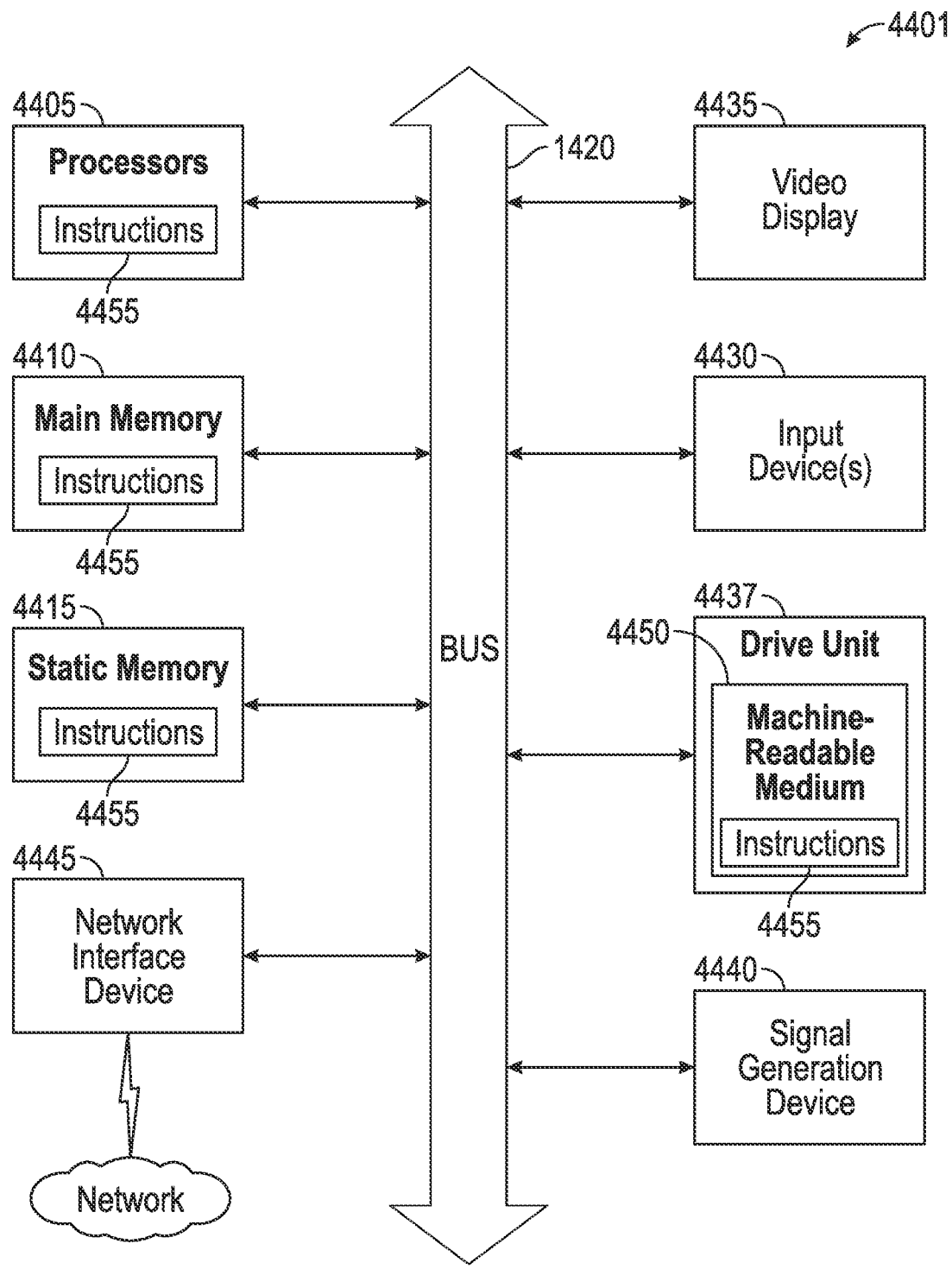
FIG. 24 is a diagrammatic representation of an embodiment of a machine in the form of a computer system.

FIG. 24 is a diagrammatic representation of an embodiment of a machine in the form of a computer system 4401, within which a set of instructions for causing the machine to perform any one or more of the methodologies discussed herein, including computer-implemented method steps used in performing any one or combination of the process described herein including but not limited to any one of the methods of determining the pattern of the plurality of reflective dots according to any one of the pattern growth models described or envisaged herein. In various example embodiments, the machine operates as a standalone device, may be connected (e.g., networked) to other machines or integrated in the head mounted display or head up display itself. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The embodiment of the computer system 4401 is includes a processor or multiple processors 4405 (e.g., a central processing unit (CPU), a graphics processing unit (GPU), or both), and a main memory 4410 and static memory 4415, which communicate with each other via a bus 4420. The computer system 4401 may further include a video display 4435 (e.g., a liquid crystal display (LCD)). The computer system 4401 may also include an alpha-numeric input device(s) 4430 (e.g., a keyboard), a cursor control device (e.g., a mouse), a voice recognition or biometric verification unit (not shown), a drive unit 4437 (also referred to as disk drive unit), a signal generation device 4440 (e.g., a speaker), and a network interface device 4445. The computer system 4401 may further include a data encryption module (not shown) to encrypt data.

The drive unit 4437 includes a computer or machine-readable medium 4450 on which is stored one or more sets of instructions and data structures (e.g., instructions 4455) embodying or utilizing any one or more of the methodologies or functions described herein. The instructions 4455 may also reside, completely or at least partially, within the main memory 4410 and/or within the processors 4405 during execution thereof by the computer system 4401. The main memory 4410 and the processors 4405 may also constitute machine-readable media.

The instructions 4455 may further be transmitted or received over a network via the network interface device 4445 utilizing any one of a number of well-known transfer protocols (e.g., Hyper Text Transfer Protocol (HTTP)).

While the machine-readable medium 4450 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 4401 are required and thus portions of the computer system 4401 can be removed if not needed, such as Input/Output (I/O) devices (e.g., input device(s) 4430). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present technology. In this regard, the block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

All publications (including those listed below), patents and patent applications referred to herein are incorporated by reference in their entirety to the same extent as if each individual publication, patent or patent application was specifically and individually indicated to be incorporated by reference in its entirety.

REFERENCES

[1] C. W. a. O. Becklund, Introduction To The optical Transfer Function, SPIE, 2010.
[2] J. Goodman, Introduction To Fourier Optics, Roberts & Company Publishers, 2005.
[3] G. Boreman, Modulation Transfer Function in Optical and Electro-Optical Systems, SPIE, 2001.
[4] A. Guirao et al, "Average Optical Performance of the Human Eye as a Function of Age in a Normal Population", pp 203-213, OKS, January 1999, Vol. 40, No. 1

[5] Carl Zeiss, Camera Lens Division, December 2008 How to Read MTF Curves by H. H. Nasse, http://kurtmunger.com/sitebuildercontent/sitebuilderfiles/zeissmtfcurves1.pdf
[6] Current v5.2, Acutance and SQF (Subjective Quality Factor), published by Imatest® at http://www.imatest.com/docs/sqf/
[7] Kestrels and Cerevisiae, Histories of Science from Kele W. Cable, Alan Turing's Reaction-Diffusion Model—Simplification of the Complex, published Dec. 1, 2010, https://phylogenous.wordpress.com/2010/12/01/alan-turings-reaction-diffusion-model-simplification-of-the-complex/)
[8] The chemical basis of morphogenesis, Alan Mathison Turing, Published: Aug. 14, 1952 https://doi.org/10.1098/rstb.1952.0012, Volume 237, Issue 641 Published by: Royal Society
[9] Physica A: Statistical Mechanics and its Applications Volume 419, Feb. 1, 2015, Pages 487-497, Pattern formation and Turing instability in an activator-inhibitor system with power-law coupling, F. A. dos S. Silva R. L. Viana S. R. Lopes, https://doi.org/10.1016/j.physa.2014.09.059, Elsevier, https://www.sciencedirect.com/science/article/pii/S0378437114008358
[10] Hearn D J (2019) Turing-like mechanism in a stochastic reaction-diffusion model recreates three dimensional vascular patterning of plant stems, PLoS ONE 14(7): e0219055. https://doi.org/10.1371/journal.pone.0219055 or https://journals.plos.org/plosone/article?id=10.1371/journal.pone.0219055#sec001

What is claimed is:

1. An optical combiner, comprising:
an optically transparent substrate; and
a patterned region included in said optically transparent substrate and disposed along a wave propagation axis of said optically transparent substrate;
wherein said patterned region is partially optically reflective and partially optically transparent;
wherein said patterned region comprises a plurality of optically transparent regions of said optically transparent substrate and a plurality of optically reflective sub-pupil dots, said plurality of optically reflective sub-pupil dots being inclined relative to said wave propagation axis;
wherein said patterned region is a growth pattern region; and
wherein said growth pattern region is determined according to a reaction diffusion model.

2. The optical combiner as claimed in claim 1, wherein said optically transparent substrate comprises an optical waveguide substrate.

3. The optical combiner as claimed in claim 1, wherein said optically transparent substrate comprises a near eye optical waveguide substrate.

4. The optical combiner of claim 1, wherein the reaction diffusion model comprises a Turing Reaction Diffusion model.

5. An optical combiner, comprising
an optically transparent substrate; and
a patterned region included in the optically transparent substrate and disposed along a wave propagation axis of the optically transparent substrate;
wherein the patterned region comprises a plurality of optically transparent regions of the optically transparent substrate and a plurality of optically reflective sub-pupil dots, the plurality of optically reflective sub-pupil dots being inclined relative to the wave propagation axis; and
wherein the patterned region comprises a growth pattern region determined according to a pattern growth model that comprises a reaction diffusion model.

6. The optical combiner of claim 5, wherein the pattern growth model comprises a Turing Reaction Diffusion model.

7. The optical combiner of claim 5, wherein the pattern growth model comprises a randomly generated growth model.

8. The optical combiner of claim 5, wherein the optically transparent substrate comprises an optical waveguide substrate.

9. The optical combiner of claim 5, wherein the optically transparent substrate comprises a near eye optical waveguide substrate.

10. The optical combiner of claim 5, wherein the patterned region is included in at least one common plane traversing the wave propagation axis.

11. An optical combiner, comprising
an optically transparent substrate; and
a patterned region included in the optically transparent substrate and disposed along a wave propagation axis of the optically transparent substrate;
wherein the patterned region comprises a plurality of optically transparent regions of the optically transparent substrate and a plurality of optically reflective dots; and
wherein the patterned region comprises a growth pattern region determined according to a pattern growth model that comprises a reaction diffusion model.

12. The optical combiner of claim 11, wherein the plurality of optically reflective dots are inclined relative to the wave propagation axis.

13. The optical combiner of claim 11, wherein the plurality of optically reflective dots comprises sub-pupil dots.

14. The optical combiner of claim 11, wherein the pattern growth model comprises a Turing Reaction Diffusion model.

15. The optical combiner of claim 11, wherein the pattern growth model comprises a randomly generated growth model.

16. The optical combiner of claim 11, wherein the optically transparent substrate comprises an optical waveguide substrate.

17. The optical combiner of claim 11, wherein the optically transparent substrate comprises a near eye optical waveguide substrate.

18. The optical combiner of claim 11, wherein the patterned region is included in at least one common plane traversing the wave propagation axis.

* * * * *